(12) United States Patent
Bayat et al.

(10) Patent No.: US 12,040,440 B2
(45) Date of Patent: Jul. 16, 2024

(54) SYSTEMS AND METHODS OF BATTERY MANUFACTURING

(71) Applicant: Rivian IP Holdings, LLC, Plymouth, MI (US)

(72) Inventors: Daniel Bayat, Reno, NV (US); Susheel Teja Gogineni, Sunnyvale, CA (US); Rajeev Dhiman, Pleasanton, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 87 days.

(21) Appl. No.: 18/057,351

(22) Filed: Nov. 21, 2022

(65) Prior Publication Data

US 2024/0170707 A1    May 23, 2024

(51) Int. Cl.
*H01M 10/04* (2006.01)
*B60L 50/64* (2019.01)
*H02J 7/00* (2006.01)

(52) U.S. Cl.
CPC ......... *H01M 10/0404* (2013.01); *B60L 50/64* (2019.02); *H02J 7/0042* (2013.01); *H01M 2220/20* (2013.01)

(58) Field of Classification Search
CPC .......... H01M 10/0404; H01M 2220/20; B60L 50/64; H02J 7/0042
See application file for complete search history.

(56) References Cited

U.S. PATENT DOCUMENTS

| | | | |
|---|---|---|---|
| 9,246,185 B2* | 1/2016 | Kretschmar | H01M 10/0583 |
| 2013/0111739 A1 | 5/2013 | Wu et al. | |
| 2023/0387445 A1* | 11/2023 | Dhiman | H01M 10/0404 |
| 2024/0063421 A1* | 2/2024 | Bayat | H01M 10/0468 |

* cited by examiner

*Primary Examiner* — Jared Fureman
*Assistant Examiner* — Duc M Pham
(74) *Attorney, Agent, or Firm* — Foley & Lardner LLP

(57) ABSTRACT

A system to manufacture an electrode layer stack is disclosed. The system can include a conveyor device to move a carrier. The system can include a first placing device to place a first electrode layer on the carrier. The system can include a first alignment device to obtain first positional information associated with the first electrode layer. The system can include a second placing device to place a second electrode layer on the first electrode layer based on the first positional information to form the electrode layer stack. The electrode layer stack can include a separator layer between the first electrode layer and the second electrode layer.

20 Claims, 14 Drawing Sheets

SYSTEMS AND METHODS OF BATTERY MANUFACTURING

INTRODUCTION

Vehicles can use electricity to power a motor. Electricity can be provided by a battery to operate the vehicle or components thereof.

SUMMARY

A system for manufacturing an electrode layer stack can include at least one alignment device to provide alignment data (e.g., positional information) to a placing device (e.g., an actuator, a tensioner and holder, or some other placing device) related to a position of an electrode layer so that the electrode layers can be stacked with a high degree of accuracy and tighter tolerances. For example, the placing device can lift the electrode layer from the bin, articulate the battery electrode layer to align the electrode layer based on the positional information, and place the electrode layer on a carrier of a conveyor system with the carrier in a first position. A conveyor system can move the carrier to the second position, where a second alignment device (e.g., vision device, video camera, laser system, or other positional measurement device) can obtain second positional information of the electrode layer within the carrier.

A third alignment device can obtain third positional information associated with the second electrode layer and provide the third positional information to a second placing device. The second placing device can lift the second electrode from the second bin, articulate the second electrode layer based on the second positional information associated with the first electrode layer and the third positional information associated with the second electrode, and place the second electrode layer on top of the first electrode layer to form an electrode layer stack. The second electrode layer can be placed on the first electrode layer with a separator layer positioned therebetween. For example, at least one sheet (e.g., continuous layer or web) of separator material can be provided between the carrier and the first electrode layer at the first position. A second sheet (e.g., continuous layer or web) of separator material can be provided between the first electrode layer and the second electrode layer before the second layer is placed on the first electrode layer in the third position. The first or second electrode layer can be a monocell electrode layer or a solid state electrode. For example, the electrode layer can include a separator layer (e.g., electrolyte layer) laminated to or otherwise integrated with at least one side of the electrode layer.

At least one aspect is directed to a system to manufacture an electrode layer stack. The system can include a conveyor device to move a carrier. The system can include a first placing device to place a first electrode layer on the carrier. The system can include a first alignment device to obtain first positional information associated with the first electrode layer. The system can include a second placing device to place a second electrode layer on the first electrode layer based on the first positional information to form the electrode layer stack. The electrode layer stack can include a separator layer between the first electrode layer and the second electrode layer.

At least one aspect is directed to a method. The method can include placing, via a first placing device, a first electrode layer in a carrier with the carrier in a first position. The method can include obtaining, via a first alignment device, positional information associated with the first electrode layer with the carrier in a second position. The method can include placing, via a second placing device based on the positional information, a second electrode layer on the first electrode layer with the carrier in a third position to form an electrode layer stack. The electrode layer stack can include a first separator layer between the first electrode layer and the second electrode layer.

At least one aspect is directed to an electric vehicle. The electric vehicle can include a battery cell including a plurality of electrode layers stacked to form an electrode layer stack. The electrode layer stack can be produced by placing, via a first placing device, a first electrode layer in a carrier with the carrier in a first position. The electrode layer stack can be produced by obtaining, via a first alignment device, positional information associated with the first electrode layer with the carrier in a second position. The electrode layer stack can be produced by placing, via a second placing device based on the positional information, a second electrode layer on the first electrode layer with the carrier in a third position to form an electrode layer stack. The electrode layer stack can include a first separator layer between the first electrode layer and the second electrode layer.

At least one aspect is directed to a method of providing a system. The system can include a conveyor device to move a carrier. The system can include a first placing device to place a first electrode layer on the carrier. The system can include a first alignment device to obtain first positional information associated with the first electrode layer. The system can include a second placing device to place a second electrode layer on the first electrode layer based on the first positional information to form the electrode layer stack. The electrode layer stack can include a separator layer between the first electrode layer and the second electrode layer.

At least one aspect is directed to a method of providing a battery cell. The battery cell can include a plurality of electrode layers stacked to form an electrode layer stack. The electrode layer stack can be produced by placing, via a first placing device, a first electrode layer in a carrier with the carrier in a first position. The electrode layer stack can be produced by obtaining, via a first alignment device, positional information associated with the first electrode layer with the carrier in a second position. The electrode layer stack can be produced by placing, via a second placing device based on the positional information, a second electrode layer on the first electrode layer with the carrier in a third position to form an electrode layer stack. The electrode layer stack can include a first separator layer between the first electrode layer and the second electrode layer.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
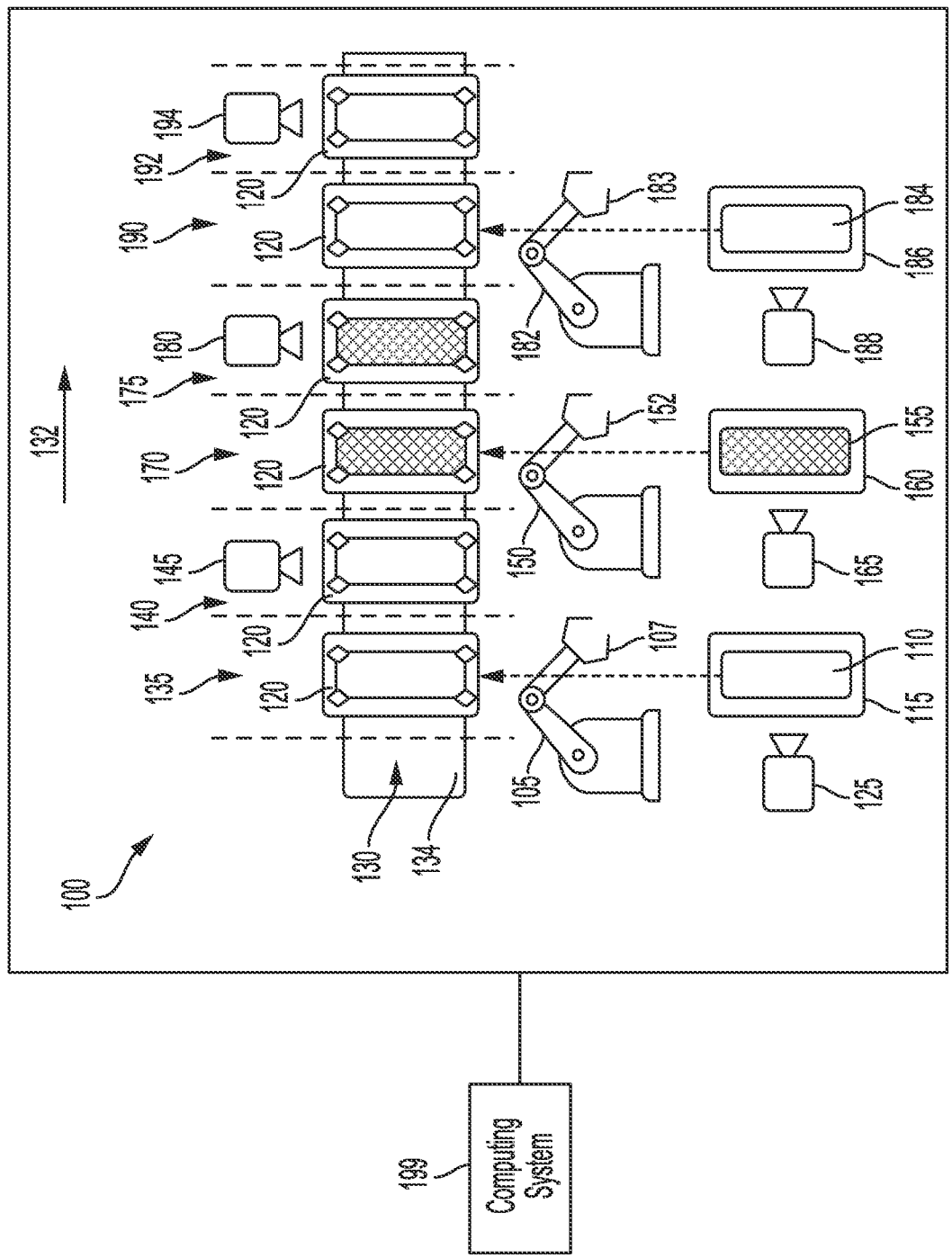
FIG. 1 depicts an example system for manufacturing an electrode layer stack, in accordance with some aspects.

Following below are more detailed descriptions of various concepts related to, and implementations of, methods, apparatuses, and systems of manufacturing an electrode layer stack. The various concepts introduced above and discussed in greater detail below may be implemented in any of numerous ways.

The present disclosure is directed to systems and methods of manufacturing a battery. More particularly, the present disclosure is directed to systems and methods of stacking battery electrode layers to form a battery electrode stack. The systems and methods can receive singulated battery electrode layers, such as singulated anode layers, singulated separator layers, and singulated cathode layers, and can stack the singulated layers individually to form a stack of electrode layers used to form a prismatic battery cell, for example. The systems and methods can stack the electrode layers in a collated fashion.

The disclosed solutions have a technical advantage of stacking battery electrode layers in a collated manner in order to produce an electrode layer stack at a rapid rate. The systems and methods can operate in a continuous fashion with minimal downtime. For example, the systems and methods can, based on information provided by the alignment system, reject a misaligned battery electrode stack without halting the stacking operation in order to maintain a desired rate of throughput. The systems and methods can include at least one alignment device to provide alignment data to a placing device (e.g., an actuator, a tensioner and holder, or some other placing device) related to a position of an electrode layer so that the electrode layers can be stacked with a high degree of accuracy and tighter tolerances. The alignment device can be a vision device (e.g., video camera system) that can provide positional information associated with an electrode layer to the placing device as the electrode layer is provided to a stacking system via a bin. For example, the placing device can lift the electrode layer from the bin, articulate the battery electrode layer to align the electrode layer based on the positional information, and place the electrode layer on a carrier of a conveyor system with the carrier in a first position. The carrier can include a clamp (e.g., finger) to hold the electrode layer against the carrier. The carrier can be coupled with a conveyor system that can move the carrier from the first position to a second position, from the second position to a third position, and so on. The conveyor system can move the carrier to the second position, where a second alignment device (e.g., vision device, video camera, laser system, or other positional measurement device) can obtain second positional information of the electrode layer within the carrier.

A second electrode layer can be provided to the stacking system via a second bin proximate to a third position of the conveyor system. A third alignment device can obtain third positional information associated with the second electrode layer and provide the third positional information to a second actuator. The second actuator can lift the second electrode from the second bin, articulate the second electrode layer based on the second positional information associated with the first electrode layer and the third positional information associated with the second electrode, and place the second electrode layer on top of the first electrode layer to form an electrode layer stack. The second actuator can use the second positional information associated with the first electrode layer and the third positional information associated with the second to articulate the second electrode layer so that the second electrode layer can be accurately placed on the first electrode layer in the carrier (e.g., a center point of the first electrode layer is aligned with a center point of the second electrode layer, an edge of the first electrode layer is aligned with an edge of the second electrode layer) in order to prevent misalignment of electrode layers. The clamp of the carrier can be released prior to placing the second electrode layer and can then clamp the second electrode and the first electrode against the carrier.

The first or second electrode layer can be a monocell electrode layer or a half-cell electrode layer. For example, the electrode layer can be or include a half-cell including a separator layer (e.g., electrolyte layer) laminated to, bonded with, or integrated with at least one side of the electrode layer. The electrode layer can be or include a monocell including an anode electrode layer, a cathode electrode layer, and two separator layers with at least one separator layer positioned between or laminated to the anode electrode layer and the cathode electrode layer. Placing the second electrode layer on the first electrode layer can include stacking an anode layer or cathode layer on top of a cathode layer or anode layer, respectively, with a separator layer positioned therebetween and coupled to one of the anode layer or the cathode layer, for example. In other examples, the electrode layer can be a solid state electrode including a solid state electrolyte material. For example, the electrode layer can be a cathode layer having a solid state electrode material and a solid state electrolyte material such that the cathode layer can be stacked against a lithium metal foil anode with no additional separator layer disposed therebetween. The first electrode layer and the second electrode layer can be an electrode layer without a separator layer laminated to one side of the first or second electrode layer. For example, at least one sheet (e.g., continuous layer or web) of separator material can be provided between the carrier and the first electrode layer at the first position. A second sheet (e.g., continuous layer or web) of separator material can be provided between the first electrode layer and the second electrode layer before the second layer is placed on the first electrode layer in the third position. The clamp of the carrier can apply a clamping force to the separator material and the first or second electrode material as the carrier moves from one position to another. The clamp force can pull (e.g., apply a tension force) to the separator material and unroll the separator material from a roll of separator material. The separator material can be pulled along multiple positions of the conveyor system such that the each layer of separator material is a continuous sheet across multiple positions of the conveyor device positioned between electrode layers. A laser device can singulate the layers of separator material. For example, after a final electrode layer is placed to complete the electrode layer stack, a laser device can singulate (e.g., cut, divide, or slice) the continuous layers of separator material.

A system 100 can include at least one conveyor device 130, at least one carrier 120, at least one first placing device 105, at least one first alignment device 145, and at least one second placing device 150. For example, the system 100 can include the carrier 120 coupled with the conveyor device 130. The first placing device 105 can place an electrode layer (e.g., a cathode or anode electrode active material adhered to a current collector foil, a solid-state electrolyte layer, a separator or electrolyte layer, or some other layer) on the carrier 120 with the carrier 120 on the conveyor device 130. For example, the first placing device 105 can place the first electrode layer 110 on the carrier 120. The first alignment device 145 can obtain positional information regarding the electrode layer. The first alignment device 145 can provide the positional information to controller (e.g., a computing system 199). The computing system 199 can use the positional information regarding the placed electrode layer to affect (e.g., modify, change, alter, control) a movement of a second placing device 150. For example, the second placing device 150 can place a second electrode layer (e.g., an anode or cathode electrode active material adhered to a current collector foil, a solid-state electrolyte layer, a separator or electrolyte layer, or some other layer). The second placing device 150 can place the second electrode layer 155 on the first electrode layer 110 with the first electrode layer 110 on the carrier 120. The second placing device 150 can place the second electrode layer 155 based on the positional information obtained by the first alignment device 145 regarding the first electrode layer 110. For example, the second placing device 150 can place the second electrode layer 155 on the first electrode layer 110 based on the positional information associated with the first electrode layer 110 to align the second electrode layer 155 with the first electrode layer 110 (e.g., to ensure a center point of the first electrode layer 110 is aligned with a center point of the second electrode layer 155, to ensure an edge of the first electrode layer 110 is aligned with an edge of the second electrode layer 155).

The system 100 can include the conveyor device 130 to move at least one carrier 120. For example, the conveyor device 130 can move multiple carriers 120 in a first direction 132. The conveyor device 130 can include at least one roller or bearing operatively coupled with at least one conveyor substrate 134, such as a belt, multiple inter-connected slats, or some other substrate to support the carrier 120. For example, the carrier 120 can be coupled with the conveyor substrate 134 such that the carrier 120 is fixed to a certain position on the conveyor substrate 134 and moves with the conveyor substrate 134 as the conveyor substrate 134 advances in the first direction 132. The roller or bearing of the conveyor device 130 can be operatively coupled to an electric motor or rotational actuator to cause the roller or bearing to rotate. For example, the roller or bearing can be coupled with at least one electric motor to rotate the roller or bearing with the conveyor substrate 134 coupled with the roller or bearing. A rotation of the roller or bearing can cause the conveyor substrate 134 to advance in the first direction 132 at a first speed.

Figure 2:
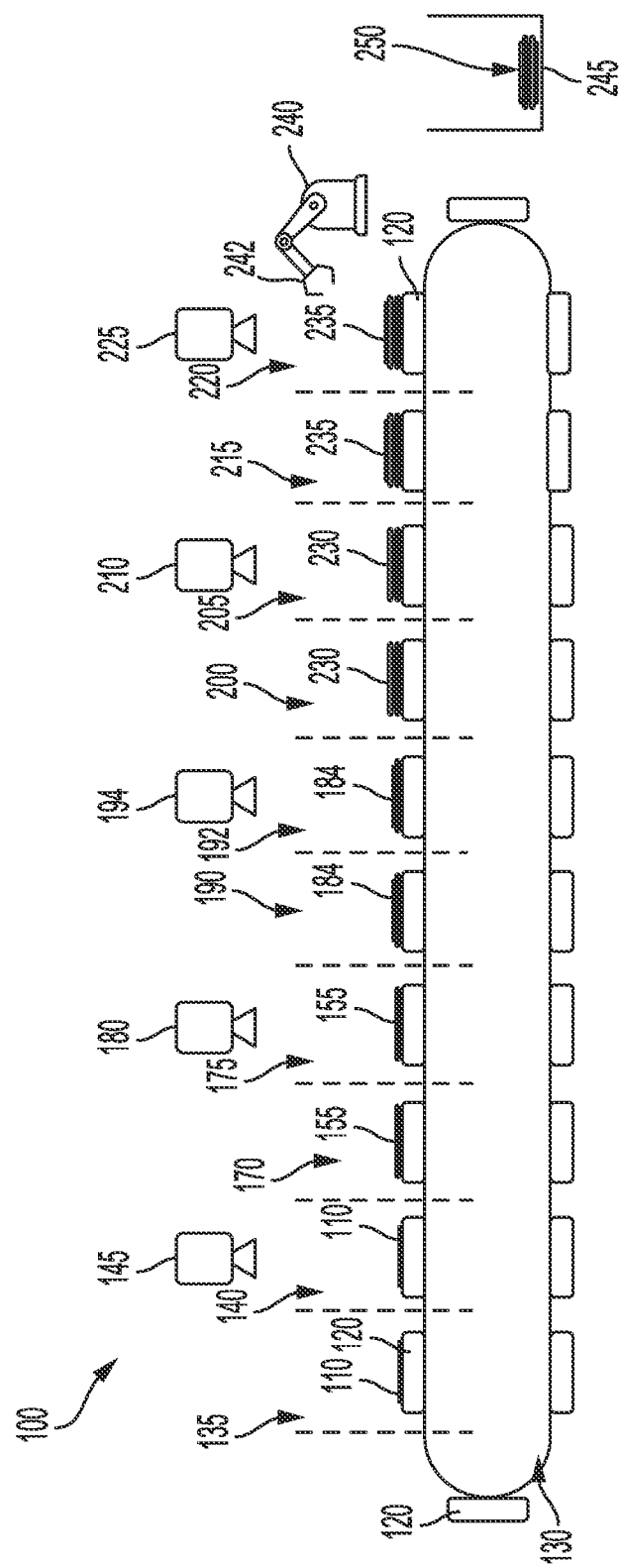
FIG. 2 depicts an example system for manufacturing an electrode layer stack, in accordance with some aspects.
Figure 3:
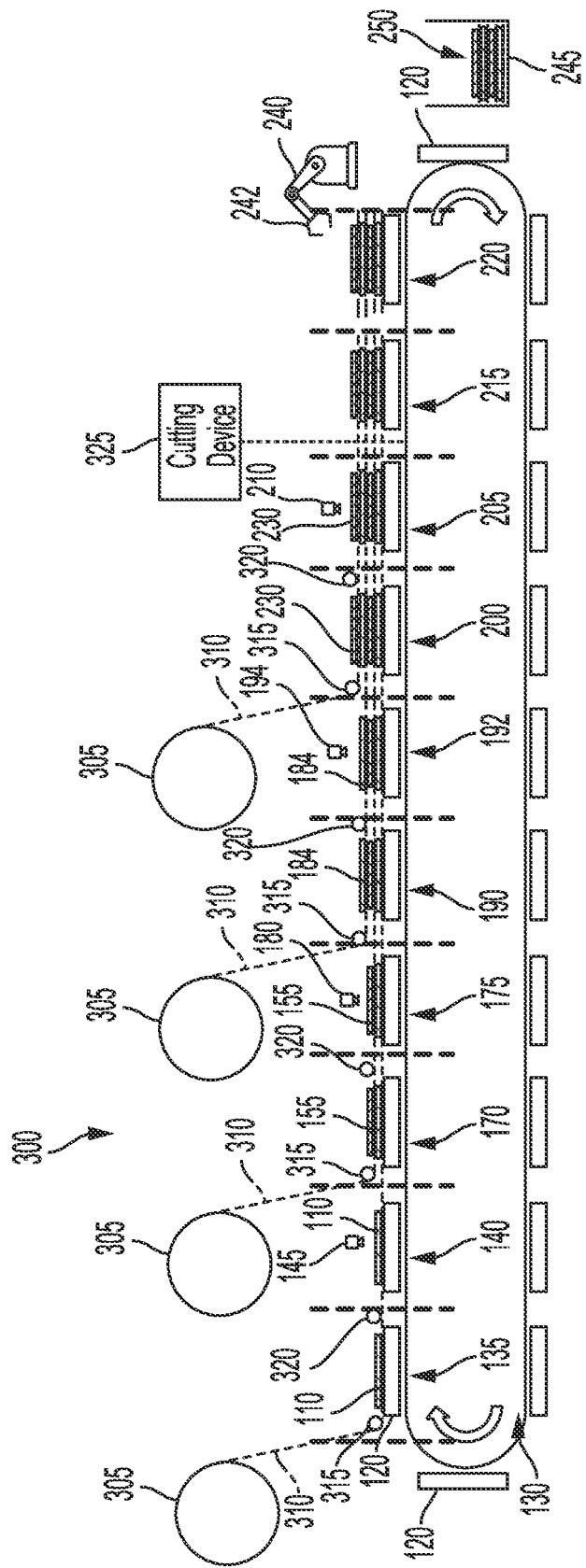
FIG. 3 depicts an example system for manufacturing an electrode layer stack, in accordance with some aspects

As depicted in FIGS. 1-3, among others, the system 100 can include the conveyor device 130 to move the carrier 120 from one position to another. For example, the conveyor device 130 can include the roller or bearing to rotate to cause the conveyor substrate 134 to move in the first direction 132 with the carrier 120 coupled with the conveyor substrate 134. The movement of the roller can cause the conveyor substrate 134 to move in the first direction 132, which can further cause the carrier 120 to move in the first direction 132. The conveyor device 130 can move the carrier 120 from a first position 135 to a second position 140, from the second position 140 to a third position 170, from the third position 170 to a fourth position 175, from the fourth position 175 to a fifth position 190, from the fifth position 190 to a sixth position 192, from the sixth position 192 to a seventh position 200, from the seventh position 200 to an eighth position 205, from the eighth position 205 to a ninth position 215, or from the ninth position 215 to a tenth position 220, or from the tenth position 220 to some other position (e.g., to the first position 135). Each of the first position 135, the second position 140, the third position 170, the fourth position 175, the fifth position 190, the sixth position 192, the seventh position 200, the eighth position 205, the ninth position 215, the tenth position 220, and some other position can be spaced at regular or irregular intervals along a length of the conveyor device 130. For example, the conveyor device 130 can advance (e.g., move, index, translate) the conveyor substrate 134 by a predetermined amount (e.g., twelve inches, twenty four inches, one-half meter, or some other distance) to move from the first position 135 to the second position 140 or from one position to another.

The conveyor substrate 134 of the conveyor device 130 can wrap around a bottom of the conveyor device 130 such that the conveyor substrate 134 can move a carrier 120 from the tenth position 220 (or a final position) to the first position 135. For example, the first position 135 can follow the final position of a carrier 120 moved by the conveyor device 130. The carrier 120 can be oriented in a first direction (e.g., upwards, with a first portion 415 facing upwards) with the carrier 120 moving from a first position 135 to a second position 140, from the second position 140 to a third position 170, from the third position 170 to a fourth position 175, from the fourth position 175 to a fifth position 190, from the fifth position 190 to a sixth position 192, from the sixth position 192 to a seventh position 200, from the seventh position 200 to an eighth position 205, from the eighth position 205 to a ninth position 215, or from the ninth position 215 to a tenth position 220. The carrier can be oriented in a second direction (e.g., downwards, sideways, or some other direction) as the carrier 120 moves from the tenth position 220 (e.g., a final position) to the first position 135, for example.

The system 100 can include at least one carrier 120 coupled with the conveyor device 130. For example, the carrier 120 can be coupled with the conveyor substrate 134 of the conveyor device 130 such that the carrier 120 is in a fixed position on the conveyor substrate 134 (e.g., the carrier 120 does not move with respect to the conveyor substrate 134). The carrier 120 can move from one position (e.g., the first position 135) to another position (e.g., the second position 140) as the conveyor substrate 134 moves in the first direction 132 along a top of the conveyor device 130. Multiple carriers 120 can be coupled with the conveyor substrate 134. For example, a carrier 120 can be coupled with the conveyor substrate 134 in each of the first position 135, the second position 140, the third position 170, the fourth position 175, the fifth position 190, the sixth position 192, the seventh position 200, the eighth position 205, the ninth position 215, or the tenth position 220. As the conveyor substrate 134 advances in the first direction 132, a carrier 120 can be coupled with the conveyor substrate 134 in each of the positions (e.g., the first position 135, the second position 140, etc.).

The system 100 can include at least one carrier 120 to support an electrode layer. For example, the carrier 120 can be a receptacle, tray, platform, or other device onto which an electrode layer (e.g., the first electrode layer 110) can be placed. The carrier 120 can include a first portion 415 that is outlined by (e.g., at least partially surrounded by) a second portion 410. For example, the second portion 410 can extend from the first portion 415 such that the second portion 410 is raised relative to the first portion 415. The first portion 415 can be recessed, forming an impression within the carrier 120, for example. The first portion 415 can extend from the second portion 410 such that the first portion 415 is raised relative to the second portion 410. The first portion 415 can include dimensions that are similar to (e.g., ±15%) a dimension (e.g., area, length, width) of an electrode layer, such as the first electrode layer 110. For example, the first portion 415 of the carrier 120 can support an electrode layer, where the electrode layer can avoid contacting the second portion 410 with the electrode layer substantially centered (e.g., ±15%) on the first portion 415. The first portion 415 can support an electrode layer with an edge of the electrode layer substantially aligned or parallel (e.g., ±15%) with an edge of the first portion 415.

Figure 4:
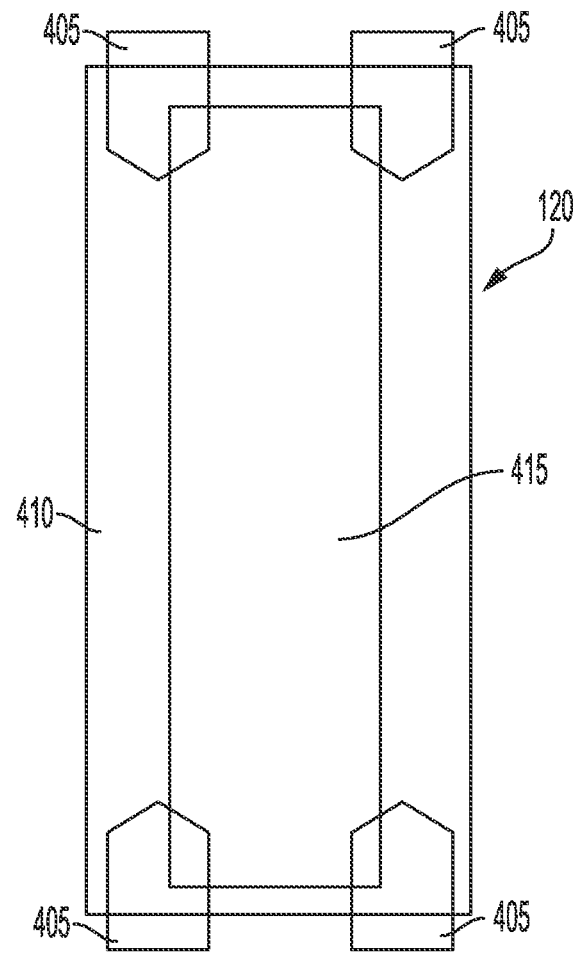
FIG. 4 depicts an example carrier of a system for manufacturing an electrode layer stack, in accordance with some aspects.

As depicted in FIG. 4, among others, the carrier 120 can include at least one holding device 405 to hold an electrode layer (e.g., the first electrode layer 110) on the carrier 120. For example, the holding device 405 can be a mechanical clamp to apply a clamping pressure to the electrode layer, a pivotable finger to pivot over and clamp down onto the electrode layer, a gripper to create friction to prevent the electrode layer form moving on the carrier 120, a textured member to create friction to prevent the electrode layer from moving on the carrier 120, a vacuum device to draw a vacuum to hold the electrode layer against the carrier 120, or some other device to retain the electrode in a particular position on the carrier 120. The holding device 405 can hold the electrode layer in a position on the first portion 415 of the carrier 120 such that the electrode layer can be substantially centered (e.g., ±15%) on the first portion or otherwise aligned with the first portion (e.g., with an edge of the electrode layer aligned with an edge of the first portion 415).

The system 100 can include at least one placing device 105. For example, the system 100 can include a first placing device 105 to place a first electrode layer 110 on the carrier 120. The placing device 105 can be a robotic device, such as a pick-and-place robot, a robotic arm, or some other robotic device. The placing device 105 can lift an electrode layer from a first location, move the electrode layer to a second location, and place the electrode layer in the second position.

For example, the placing device 105 can lift the first electrode layer 110 with the first electrode layer in a first position on a surface 115. The placing device 105 can move the first electrode layer 110 from the first location to a second location, such as a carrier 120 with the carrier in the first position 135 of the conveyor device 130. The placing device 105 can place the first electrode layer 110 in the second position such that the first electrode layer 110 is positioned on or within the carrier 120.

The first placing device 105 can be or include an actuator 107. For example, the first placing device 105 can include an actuator 107, such as a gripper, robotic clamp, pneumatic gripping device (e.g., a flexible or soft vacuum-gripper), or other actuator to lift the first electrode layer 110 or place the first electrode layer 110. The actuator 107 can lift an electrode layer, such as the first electrode layer 110, from a first location, such as a surface 115, a bin, a receptacle, or some other surface. The actuator 107 can place the electrode layer at a second location, such as the carrier 120 (e.g., the first portion 415 of the carrier 120) with the carrier 120 in the first position 135. The actuator 107 can grip (e.g., grasp, hold, retain) first electrode layer 110 as the placing device 105 moves. For example, the first placing device 105 can lift the first electrode layer 110 with the placing device 105 in a first position. The first placing device 105 can place the first electrode layer 110 with the placing device 105 in second position. The first placing device 105 can grip the first electrode layer 110 as the placing device 105 moves from the first position (e.g., a position to lift the first electrode layer 110 with the first electrode layer in the first location) to the second position (e.g., a position to place the first electrode layer 110 at a second location, such as on the carrier 120). The actuator 107 can articulate relative to the placing device 105. For example, the actuator 107 can be rotatably coupled with the placing device 105 such that the angular orientation of the actuator 107 relative to the placing device 105 can be manipulated.

The system 100 can include at least one alignment device. For example, the system 100 can include an alignment device 125 to obtain positional information associated with the first electrode layer 110 with the first electrode layer 110 on the surface 115. The positional information associated with the first electrode layer 110 can be information related to a position of the first electrode layer 110 with the first electrode layer 110 on the surface 115 or on a stack of first electrode layers. For example, the positional information associated with the first electrode layer 110 can be information regarding an angular orientation of the first electrode layer 110 relative to some reference (e.g., an edge of the surface 115) or information regarding location of a center point of the first electrode layer 110. The first alignment device 125 can be communicably coupled with the computing system 199 or some other control device. For example, the first alignment device 125 can provide positional information associated the first electrode layer 110 to the computing system 199. The computing system 199 can receive the positional information associated with the first electrode layer 110 to affect (e.g., alter, adjust, modify, change, cause) a movement of the first placing device 105 or the actuator 107 of the first placing device 105. The first alignment device 125 can be or include an optical sensor. For example, the first alignment device 125 can be or include at least one camera, at least one laser sensor, at least one infrared sensor, or some other sensor to measure one or more parameters regarding a position of the first electrode layer 110.

The system 100 can include an alignment device to obtain positional information associated with the first electrode layer 110. For example, the system 100 can include at least one alignment device 145 to obtain positional information (e.g., first positional information) associated with the first electrode layer 110 on the carrier 120. For example, the alignment device can be the alignment device 145. The alignment device 145 can obtain positional information associated with the first electrode layer 110 with the first electrode layer 110 positioned on a carrier 120 with the carrier 120 in the second position 140. The alignment device 145 can be or include an optical sensor. For example, the alignment device 145 can be or include at least one camera, at least one laser sensor, at least one infrared sensor, or some other sensor to measure one or more parameters regarding a position of the first electrode layer 110.

The first positional information associated with the first electrode layer 110 can be information related to a position of the first electrode layer 110 with the first electrode layer 110 on the carrier 120. The positional information associated with the first electrode layer 110 can be information related to the first electrode layer 110 after the first electrode layer 110 has been placed on the carrier 120 (e.g., placed by the placing device 105) with the carrier 120 in the first position 135. For example, as discussed above, the first placing device 105 can place the first electrode layer 110 on the carrier 120 with the carrier 120 in the first position 135. The conveyor device 130 can then move the carrier 120 from the first position 135 to the second position 140. The first alignment device 145 can obtain positional information associated with the first electrode layer 110 with the first electrode layer 110 supported by the carrier 120 and with the carrier 120 in the second position 140 or in the first position 135. As depicted in FIGS. 1-3, for example, the first alignment device 145 can obtain positional information associated with the first electrode layer 110 with the carrier 120 in the second position 140. The positional information can be information regarding an angular orientation of the first electrode layer 110 relative to some locator or identifier on the carrier 120. The positional information can be information regarding a distance between an edge of the first electrode layer 110 and some reference (e.g., a boundary between the first portion 415 and the second portion 410 of the carrier 120). The positional information could be to position of a center point of the first electrode layer 110 relative to some reference (e.g., a locator or identifier of the carrier 120, an edge of the carrier 120, or some other point). The positional information associated with the first electrode layer 110 can be some other information.

Figure 12:
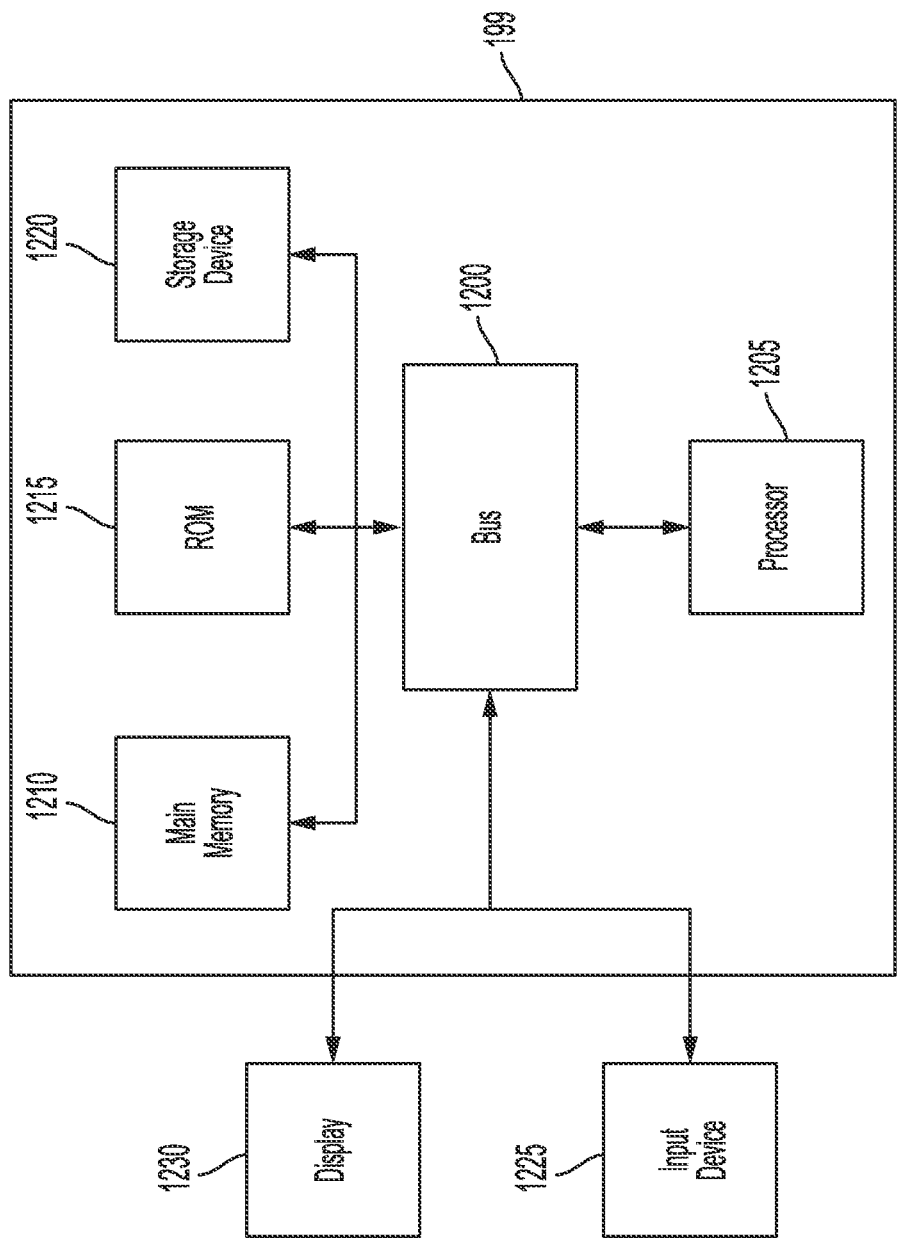
FIG. 12 is a block diagram illustrating an architecture for an example computer system that can be employed to implement elements of the systems and methods described and illustrated herein.

The system 100 can include the first placing device 105 coupled with a control device. For example, the first placing device 105 can be communicably coupled with the computing system 199 as depicted in FIG. 12, among others, and as discussed in detail herein. The computing system 199 can control or affect a movement of the first placing device 105. For example, the computing system 199 can monitor a position of the first placing device 105 (e.g., an actuator 107 of the placing device 105) and a position of another object (e.g., the first electrode layer 110, the carrier 120, or some other object). The computing system 199 can provide a command, signal, or instruction to the placing device 105 based on the monitored position of the placing device 105 or another object. For example, the computing system 199 can receive positional information regarding an electrode layer (e.g., the first electrode layer 110) and can command, based on the positional information of the electrode layer, the placing device 105 to move in a particular way. The computing system 199 can cause the placing device 105 to move in a particular way to lift or place an electrode layer in a particular orientation. For example, the computing system 199 can cause the actuator 107 of the placing device 105 to articulate (e.g., rotate, bend, or move) in a particular manner such that the actuator 107 of the placing device 105 lifts the electrode layer with the actuator 107 in a particular orientation (e.g., with the actuator 107 or a portion of the actuator 107 perpendicular to the electrode layer). The computing system 199 can cause the actuator 107 to articulate (e.g., rotate, bend, or move) in a particular manner such that the actuator 107 places the electrode layer with the electrode layer in a particular orientation (e.g., parallel to the first portion 415 of the carrier 120). The computing system 199 can control a speed of a movement of the placing device 105 or the actuator 107. The computing system 199 can cause the actuator 107 of the placing device 105 to lift (e.g., grasp, grip, pick) an electrode layer or place (e.g., release, drop, free) an electrode layer.

The first electrode layer 110 can provided to the first placing device 105 with the first electrode layer 110 on a surface 115. The surface 115 can be a receptacle (e.g., a bin, a container) a surface of a table, bench, platform or other object. The first electrode layer 110 can be provided to the first placing device 105 with the first electrode layer 110 on a stack of electrode layers. For example, a stack of electrode layers can be provided to the first placing device 105 with the stack of electrode layers on the surface 115 of a receptacle. The first electrode layer 110 can be the top-most electrode layer of the stack of electrode layers such that the first electrode layer 110 is accessible by the first placing device 105. For example, the first placing device 105 can grab (e.g., grasp, lift, grip, clasp, hold, pick-up, or otherwise lift) the first electrode layer 110 with the first electrode layer 110 positioned on a stack of multiple electrode layers on the surface 115.

The system 100 can include the first placing device 105 to place the first electrode layer 110 based on positional information associated with the first electrode layer 110. For example, the alignment device 125 can obtain positional information associated with the first electrode layer 110 with the first electrode layer 110 supported on the surface 115 or on a stack of electrode layers positioned on the surface 115. The alignment device 125 can communicate the positional information associated with the first electrode layer 110 to the computing system 199 or other control device. The first placing device 105 can, based on the positional information associated with the first electrode layer 110 from the alignment device 125, lift the first electrode layer 110 with the first placing device 105 or the actuator 107 of the first placing device 105 in a particular orientation. For example, the computing system 199 can, based on the positional information associated with the first electrode layer 110 provided by the alignment device 125, transmit a command or signal to the first placing device 105 to cause the first placing device 105 to lift the first electrode layer 110 with the actuator 107 in a particular orientation. The first placing device 105 can place the first electrode layer 110 on the carrier 120 in a particular orientation or with the placing device 105 or the actuator of the placing device 105 in a particular orientation based on the positional information associated with the first electrode layer 110 from the alignment device 125. For example, the computing system 199 can, based on the positional information of the first electrode layer 110 from the alignment device 125, transmit a command or signal to the first placing device 105 to cause the first placing device 105 to place the first electrode layer 110 on the carrier 120 with the first electrode layer 110, the first placing device 105, or the actuator 107 in a particular orientation.

The first electrode layer 110 can be an electrode layer for a battery. For example, the first electrode layer 110 can be or include a current collector foil (e.g., copper foil, aluminum foil, or some other foil) with a battery active material (e.g., a cathode material or an anode material) laminated with at least one side of the current collector foil. For example, the first electrode layer 110 can be an anode electrode including an anode battery active material laminated with one or two sides of a copper current collector foil. The first electrode layer 110 can be a singulated (e.g., individual, separated, single) electrode layer including a tab. The tab, which can be a portion of current collector foil uncoated with a battery active material, can protrude or extend from an edge of the first electrode layer 110 to electrically couple the first electrode layer 110 with another electrode layer (e.g., an adjacent electrode layer in an electrode layer stack) or another current collector (e.g., a terminal for a battery cell). The first electrode layer 110 can be a monocell electrode layer. For example, the first electrode layer 110 can include a separator layer (e.g., electrolyte layer) laminated with, bonded with, or integrated with at least one side of the first electrode layer 110. The separator layer can be a polymeric or other electrolyte layer that can subsequently be wetted (e.g., exposed to, at least partially saturated by) liquid electrolyte. The first electrode layer 110 can be a solid state electrode including a solid state electrolyte material. For example, the first electrode layer 110 can be a cathode layer having a solid state electrode material and a solid state electrolyte material such that the cathode layer can be stacked against a lithium metal foil anode with no additional separator layer disposed therebetween. The first electrode layer 110 can be an electrode layer without a separator layer laminated with, bonded with, or integrated with, one side of the first electrode layer 110 (e.g., a battery active material layer of the first electrode layer 110). For example, the first electrode layer 110 can be a current collector material coated with a battery active material, and a separate separator layer can be provided between the first electrode layer 110 and an adjacent electrode layer (e.g., a second electrode layer 155) when the first electrode layer 110 is stacked to create an electrode layer stack.

The system 100 can include at least one second placing device 150. For example, the system 100 can include the second placing device 150 to place a second electrode layer 155 on the first electrode layer 110. The second placing device 150 can be a robotic device, such as a pick-and-place robot, a robotic arm, or some other robotic device. The second placing device 150 can lift an electrode layer from a first location, move the electrode layer to a second location, and place the electrode layer in the second position. For example, the second placing device 150 can place the second electrode layer 155 on the first electrode layer 110 with the first electrode 110 supported on the carrier 120. The second placing device 150 can lift a second electrode layer 155 with the second electrode layer 155 in a first position on a surface 160 (e.g., a surface of a receptacle, bin, table, or other surface). The second placing device 150 can move the second electrode layer 155 from the first location to a second location, such as a carrier 120 with the carrier in the third position 170 of the conveyor device 130. The second placing device 150 can place the second electrode layer 155 in the third position 170 such that the second electrode layer 155 is positioned on or within the carrier 120. For example, the second placing device 150 can place the second electrode layer 155 on the first electrode layer 110 that has already been placed on the carrier 120 when the carrier was in the first position 135, for example. The second placing device 150 can place the second electrode layer 155 on the first electrode layer 110 to create an electrode layer stack 250.

The second placing device 150 can be or include an actuator 152. For example, the second placing device 150 can include an actuator 152, such as a gripper, robotic clamp, pneumatic gripping device (e.g., a flexible or soft vacuum-gripper), or other actuator to lift the second electrode layer 155 or place the second electrode layer 155. The actuator 152 can lift an electrode layer, such as second electrode layer 155, from a first location, such as a surface 160, a bin, a receptacle, or some other surface. The actuator 152 can place the electrode layer at a second location, such as the carrier 120 (e.g., the first portion 415 of the carrier 120) with the carrier 120 in the third position 170. The actuator 152 can grip (e.g., grasp, hold, retain) second electrode layer 155 as the placing device 150 moves. For example, the second placing device 150 can lift the second electrode layer 155 with the placing device 150 in a first position. The second placing device 150 can place the second electrode layer 155 with the placing device 150 in second position. The second placing device 150 can grip the second electrode layer 155 as the second placing device 150 moves from the first position (e.g., a position to lift the second electrode layer 155 from a first location such as the surface 160) to the second position (e.g., a position to place the second electrode layer 155 at a second location, such as on the carrier 120 in the third position 170). The actuator 152 can articulate relative to the placing device 150. For example, the actuator 152 can be rotatably coupled with the second placing device 150 such that the angular orientation of the actuator 152 relative to the placing device 150 can be manipulated.

The system 100 can include at least one alignment device. For example, the system 100 can include an alignment device 165 to obtain positional information associated with the second electrode layer 155 with the second electrode layer 155 on the surface 160. The positional information associated with the second electrode layer 155 can be information related to a position of the second electrode layer 155 with the second electrode layer 155 on the surface 160 or on a stack of second electrode layers. For example, the positional information associated with the second electrode layer 155 can be information regarding an angular orientation of the second electrode layer 155 relative to some reference (e.g., an edge of the surface 160) or information regarding location of a center point of the second electrode layer 155. The alignment device 165 can be communicably coupled with the computing system 199 or some other control device. For example, the alignment device 165 can provide positional information associated the second electrode layer 155 to the computing system 199. The computing system 199 can receive the positional information associated with the second electrode layer 155 to affect (e.g., alter, adjust, modify, change, cause) a movement of the second placing device 150 or the actuator 152 of the second placing device 150. The alignment device 165 can be or include an optical sensor. For example, the alignment device 165 can be or include at least one camera, at least one laser sensor, at least one infrared sensor, or some other sensor to measure one or more parameters regarding a position of the second electrode layer 155.

The system 100 can include an alignment device to obtain positional information associated with the second electrode layer 155. For example, the system 100 can include at least one alignment device 180 to obtain positional information (e.g., second positional information) associated with the second electrode layer 155 with the second electrode layer 155 on the carrier 120 (e.g., position on the first electrode layer 110 with the first electrode layer 110 on the carrier 120). For example, the alignment device can be the alignment device 180. The alignment device 180 can obtain positional information associated with the second electrode layer 155 with the second electrode layer 155 positioned on a carrier 120 with the carrier 120 in the fourth position 175. The alignment device 180 can be or include an optical sensor. For example, the alignment device 180 can be or include at least one camera, at least one laser sensor, at least one infrared sensor, or some other sensor to measure one or more parameters regarding a position of the second electrode layer 155.

The positional information associated with the second electrode layer 155 can be information related to a position of the second electrode layer 155 with the second electrode layer 155 on the carrier 120. The positional information associated with the second electrode layer 155 can be information related to the second electrode layer 155 after the second electrode layer 155 has been placed on the carrier 120 (e.g., placed by the second placing device 150) with the carrier 120 in the third position 170. For example, as discussed above, the second placing device 150 can place the second electrode layer 155 on the carrier 120 (e.g., on the first electrode layer 110 with the first electrode layer 110 on the carrier 120) with the carrier 120 in the third position 170. The conveyor device 130 can then move the carrier 120 from the third position 170 to the fourth position 175. The alignment device 180 can obtain positional information associated with the second electrode layer 155 with the second electrode layer 155 supported by the carrier 120 and with the carrier 120 in the fourth position 175 or in the third position 170. As depicted in FIGS. 1-3, for example, the alignment device 180 can obtain positional information associated with the second electrode layer 155 with the carrier 120 in the fourth position 175. The positional information can be information regarding an angular orientation of the second electrode layer 155 relative to some locator or identifier on the carrier 120. The positional information can be information regarding a distance between an edge of the second electrode layer 155 and some reference (e.g., a boundary between the first portion 415 and the second portion 410 of the carrier 120 or an edge of the first electrode layer 110 on which the second electrode layer 155 is stacked). The positional information could be to position of a center point of the second electrode layer 155 relative to some reference (e.g., a locator or identifier of the carrier 120, an edge of the carrier 120, a center point of the first electrode layer 110 as determined by the alignment device 145). For example, the alignment device 180 can determine a position of a center point of the second electrode layer 155, which can be compared with a position of a center point of the first electrode layer 110 by the computing system 199, for example. A position of a center point of the first electrode layer 110, which can be determined based on positional information associated with the first electrode layer 110 obtained by the alignment device 145, can be compared with a position of a center point of second electrode layer 155 to determine an alignment of the center points, for example. The positional information associated with the second electrode layer 155 can be some other information.

The system 100 can include the second placing device 150 coupled with a control device. For example, the second placing device 150 can be communicably coupled with the computing system 199 as depicted in FIG. 12, among others. The computing system 199 can control or affect a movement of the second placing device 150. For example, the computing system 199 can monitor a position of the second placing device 150 (e.g., an actuator 152 of the placing device 150) and a position of another object (e.g., the second electrode layer 155, the carrier 120, or some other object). The computing system 199 can provide a command, signal, or instruction to the second placing device 150 based on the monitored position of the second placing device 150 or another object. For example, the computing system 199 can receive positional information regarding an electrode layer (e.g., the first electrode layer 110 or the second electrode layer 155) and can command, based on the positional information of one or more electrode layers, the second placing device 150 to move in a particular way. The computing system 199 can cause the second placing device 150 to move in a particular way to lift or place an electrode layer in a particular orientation. For example, the computing system 199 can cause the actuator 152 of the second placing device 150 to articulate (e.g., rotate, bend, or move) in a particular manner such that the actuator 152 of the placing device 150 lifts the electrode layer with the actuator 152 in a particular orientation (e.g., with the actuator 152 or a portion of the actuator 152 perpendicular to the second electrode layer 155). The computing system 199 can cause the actuator 152 to articulate (e.g., rotate, bend, or move) in a particular manner such that the actuator 152 places the second electrode layer 155 with the second electrode layer 155 in a particular orientation (e.g., parallel to the first portion 415 of the carrier 120). The computing system 199 can control a speed of a movement of the second placing device 150 or the actuator 152. The computing system 199 can cause the actuator 152 of the second placing device 150 to lift (e.g., grasp, grip, pick) an electrode layer or place (e.g., release, drop, free) an electrode layer.

The system 100 can include the second placing device 150 to place the second electrode layer 155 based on positional information associated with the second electrode layer 155. For example, the alignment device 165 can obtain positional information associated with the second electrode layer 155 with the second electrode layer 155 supported on the surface 160 or on a stack of second electrode layers positioned on the surface 160. The alignment device 165 can communicate the positional information associated with the second electrode layer 155 to the computing system 199 or other control device. The second placing device 150 can, based on the positional information associated with the second electrode layer 155 from the alignment device 165, lift the second electrode layer 155 with the second placing device 150 or the actuator 152 of the second placing device 150 in a particular orientation. For example, the computing system 199 can, based on the positional information associated with the second electrode layer 155 provided by the alignment device 165, transmit a command or signal to the second placing device 150 to cause the second placing device 150 to lift the second electrode layer 155 with the actuator 152 in a particular orientation. The second placing device 150 can lift the second electrode layer 155 in a particular orientation based on the positional information associated with the second electrode layer 155 obtained by the alignment device 165 such that a position of at least one edge or a center point of the second electrode layer 155 is known (by the computing system 199 or otherwise). The second placing device 150 can place the second electrode layer 155 on the carrier 120 in a particular orientation or with the second placing device 150 or the actuator 152 of the second placing device 150 in a particular orientation based on the positional information associated with the second electrode layer 155 from the alignment device 165. For example, the computing system 199 can, based on the positional information of the second electrode layer 155 from the alignment device 165, transmit a command or signal to the second placing device 150 to cause the second placing device 150 to place the second electrode layer 155 on the carrier 120 with the second electrode layer 155, the second placing device 150, or the actuator 152 in a particular orientation or in a particular manner.

The system 100 can include the second placing device 150 to place the second electrode layer 155 on the first electrode layer 110 based on positional information regarding the first electrode layer 110. For example, the alignment device 145 can obtain positional information associated with the first electrode layer 110. The alignment device 145 can obtain positional information associated with the first electrode layer 110 with the carrier in the second position 140. For example, the alignment device 145 can obtain positional information associated with the first electrode layer 110 before the second placing device 150 places the second electrode layer 155 on the first electrode layer 110. As noted above, the positional information associated with the first electrode layer 110 can be information related to a position of a center point of the first electrode layer 110, a position of at least one edge of the first electrode layer 110, a position of the first electrode layer relative to some reference (e.g., a point or edge of the carrier 120), or some other information associated with a position or dimension of the first electrode layer 110. The second placing device 150 can place the second electrode layer 155 on the first electrode layer 110 in a particular orientation or in a particular manner based on the previously-obtained positional information associated with the first electrode layer 110. For example, the second placing device 150 can place the second electrode layer 155 on the first electrode layer 110 with a center point of the first electrode layer 110 aligned or substantially aligned (e.g., within 1 cm, within 1 mm, within less than 1 mm) with a center point of the second electrode layer 155. The second placing device 150 can place the second electrode layer 155 on the first electrode layer 110 with an edge of the first electrode layer 110 aligned or substantially aligned (e.g., within 1 cm, within 1 mm, within less than 1 mm) with an edge of the second electrode layer 155.

The system 100 can include the second placing device 150 to place the second electrode layer 155 on the first electrode layer 110 based on positional information associated with the first electrode layer 110 or positional information associated with the second electrode layer 155. For example, positional information associated with the first electrode layer 110 can be obtained by the alignment device 145 with the first electrode layer 110 on the carrier 120 and with the carrier 120 in the second position 140. Positional information associated with the second electrode layer 155 can be obtained by the alignment device 165 with the second electrode layer 155 on the surface 160 or on a stack of second electrode layers on the surface 160. The computing system 199 can cause the second placing device 150 to lift the second electrode layer 155 in a particular manner based on the positional information associated with the second electrode layer 155 and therefore place the second electrode layer 155 with the second electrode layer 155 grasped (e.g. held, retained, gripped) by the actuator 152 in a particular manner. For example, the second placing device 150 can grasp the second electrode layer 155 with an edge or a center point of the second electrode layer 155 in a particular orientation based on the positional information associated with the second electrode layer 155. The second placing device 150 can also place the second electrode layer 155 on the first electrode layer 110 based on the positional information associated with the first electrode layer 110, as discussed above. The second placing device 150 can place the second electrode layer 155 on the first electrode layer 110 with a center point of the first electrode layer 110 aligned with a center point of the second electrode layer 155 based on the positional information associated with the first electrode layer (e.g., first positional information) or the positional information associated with the second electrode layer 155 (e.g., third positional information). The second placing device 150 can place the second electrode layer 155 on the first electrode layer 110 with an edge of the first electrode layer 110 aligned with an edge of the second electrode layer 155 based on the positional information associated with the first electrode layer (e.g., first positional information) or the positional information associated with the second electrode layer 155 (e.g., third positional information).

The second electrode layer 155 can be an electrode layer for a battery. For example, the second electrode layer 155 can be or include a current collector foil (e.g., copper foil, aluminum foil, or some other foil) with a battery active material (e.g., a cathode material or an anode material) laminated with at least one side of the current collector foil. For example, the second electrode layer 155 can be a cathode electrode including a cathode battery active material laminated with one or two sides of an aluminum current collector foil. The second electrode layer 155 can be a singulated (e.g., individual, separated, single) electrode layer including a tab. The tab, which can be a portion of current collector foil uncoated with a battery active material, can protrude or extend from an edge of the second electrode layer 155 to electrically couple the second electrode layer 155 with another electrode layer (e.g., an adjacent electrode layer in an electrode layer stack) or another current collector (e.g., a terminal for a battery cell). The second electrode layer 155 can be a monocell electrode layer. For example, the second electrode layer 155 can include a separator layer (e.g., electrolyte layer) laminated with, bonded with, or integrated with at least one side of the second electrode layer 155. The separator layer can be a polymeric or other electrolyte layer that can subsequently be wetted (e.g., exposed to, at least partially saturated by) liquid electrolyte. The second electrode layer 155 can be a solid state electrode including a solid state electrolyte material. For example, the second electrode layer 155 can be a cathode layer having a solid state electrode material and a solid state electrolyte material such that the cathode layer can be stacked against a lithium metal foil anode with no additional separator layer disposed therebetween. The second electrode layer 155 can be an electrode layer without a separator layer laminated with, bonded with, or integrated with one side of the second electrode layer 155 (e.g., to a battery active material layer of the second electrode 155). For example, the second electrode layer 155 can be or include a current collector material coated with a battery active material, and a separate separator layer can be provided between the second electrode layer 155 and an adjacent electrode layer (e.g., a second electrode layer 155) when the second electrode layer 155 is stacked to create an electrode layer stack.

The second electrode layer 155 can be an electrolyte layer. For example, rather than being an electrode layer having battery active material (e.g., a cathode layer or an anode layer), the second electrode layer 155 can be an electrolyte layer, such as a solid-state electrolyte layer. The second electrode layer 155 can be a singulated, solid-state electrolyte layer that can be placed on the first electrode layer 110 and underneath a subsequent electrode layer (e.g., a third electrode layer 184) such that the second electrode layer 155 can be an electrolyte layer positioned between two electrode layers. For example, the second electrode layer 155 can be singulated sheet of separator material that includes an electrolyte material (e.g., a solid-state electrolyte sheet) or a separator material that can subsequently be wetted with (e.g., exposed to, at least partially saturated with) a liquid electrolyte material.

The second electrode layer 155 can provided to the second placing device 150 with the second electrode layer 155 on the surface 160. The surface 160 can be a receptacle (e.g., a bin, a container) or a surface of a table, bench, platform or other object, for example. The second electrode layer 155 can be provided to the second placing device 150 with the second electrode layer 155 on a stack of multiple second electrode layers. For example, a stack of second electrode layers can be provided to the second placing device 150 with the stack of second electrode layers on the surface 160 of a receptacle. The second electrode layer 155 can be the top-most second electrode layer of the stack of multiple second electrode layers such that the second electrode layer 155 is accessible by the second placing device 150. For example, the second placing device 150 can grab (e.g., grasp, lift, grip, clasp, hold, pick-up, or otherwise lift) the second electrode layer 155 with the second electrode layer 155 positioned on a stack of multiple second electrode layers on the surface 160.

The system 100 can include at least one third placing device 182. For example, the system 100 can include the third placing device 182 to place a third electrode layer 184 on the second electrode layer 155. The third placing device 182 can be a robotic device, such as a pick-and-place robot, a robotic arm, or some other robotic device. The third placing device 182 can lift an electrode layer from a first location, move the electrode layer to a second location, and place the electrode layer in the second position. For example, the third placing device 182 can place the third electrode layer 184 on the second electrode layer 155 with the second electrode 155 supported by the carrier 120. The third placing device 182 can lift a third electrode layer 184 with the third electrode layer 184 in a first position on a surface 186 (e.g., a surface of a receptacle, bin, table, or other surface). The third placing device 182 can move the third electrode layer 184 from the first location to a second location, such as a carrier 120 with the carrier 120 in the fifth position 190 of the conveyor device 130. The third placing device 182 can place the third electrode layer 184 in the fifth position 190 such that the third electrode layer 184 is positioned on or within the carrier 120. For example, the third placing device 182 can place the third electrode layer 184 on the second electrode layer 155 that has already been placed on the carrier 120 when the carrier was in the third position 170, for example. The third placing device 182 can place the third electrode layer 184 on the second electrode layer 155 to create an electrode layer stack 250.

The third placing device 182 can be or include an actuator 183. For example, the third placing device 182 can include an actuator 183, such as a gripper, robotic clamp, pneumatic gripping device (e.g., a flexible or soft vacuum-gripper), or other actuator to lift the third electrode layer 184 or place the third electrode layer 184. The actuator 183 can lift an electrode layer, such as the third electrode layer 184, from a first location, such as a surface 186, a bin, a receptacle, or some other surface. The actuator 183 can place the electrode layer at a second location, such as the carrier 120 (e.g., the first portion 415 of the carrier 120) with the carrier 120 in the fifth position 190. The actuator 183 can grip (e.g., grasp, hold, retain) third electrode layer 184 as the placing device 182 moves. For example, the third placing device 182 can lift the third electrode layer 184 with the placing device 182 in a first position. The third placing device 182 can place the third electrode layer 184 with the third placing device 182 in a second position. The third placing device 182 can grip the third electrode layer 184 as the third placing device 182 moves from the first position (e.g., a position to lift the third electrode layer 184 from a first location such as the surface 186) to the second position (e.g., a position to place the third electrode layer 184 at a second location, such as on the carrier 120 in the fifth position 190). The actuator 183 can articulate relative to the third placing device 182. For example, the actuator 183 can be rotatably coupled with the third placing device 182 such that the angular orientation of the actuator 183 relative to the third placing device 182 can be manipulated.

The system 100 can include at least one alignment device. For example, the system 100 can include an alignment device 188 to obtain positional information associated with the third electrode layer 184 with the third electrode layer 184 on the surface 186. The positional information associated with the third electrode layer 184 can be information related to a position of the third electrode layer 184 with the third electrode layer 184 on the surface 186 or on a stack of second electrode layers. For example, the positional information associated with the third electrode layer 184 can be information regarding an angular orientation of the third electrode layer 184 relative to some reference (e.g., an edge of the surface 186) or information regarding location of a center point of the third electrode layer 184. The alignment device 188 can be communicably coupled with the computing system 199 or some other control device. For example, the alignment device 188 can provide positional information associated the third electrode layer 184 to the computing system 199. The computing system 199 can receive the positional information associated with the second electrode layer 155 to affect (e.g., alter, adjust, modify, change, cause) a movement of the third placing device 182 or the actuator 183 of the third placing device 182. The alignment device 188 can be or include an optical sensor. For example, the alignment device 188 can be or include at least one camera, at least one laser sensor, at least one infrared sensor, or some other sensor to measure one or more parameters regarding a position of the third placing device 182.

The system 100 can include an alignment device to obtain positional information associated with the third electrode layer 184. For example, the system 100 can include at least one alignment device 194 to obtain positional information associated with the third electrode layer 184 with the third electrode layer 184 on the carrier 120 (e.g., positioned on the second electrode layer 155 with the second electrode layer 155 and the first electrode layer 110 on the carrier 120). For example, the alignment device can be the alignment device 194. The alignment device 194 can obtain positional information associated with the third electrode layer 184 with the third electrode layer 184 positioned on a carrier 120 with the carrier 120 in the sixth position 192. The alignment device 194 can be or include an optical sensor. For example, the alignment device 194 can be or include at least one camera, at least one laser sensor, at least one infrared sensor, or some other sensor to measure one or more parameters regarding a position of the third electrode layer 184.

The positional information associated with the third electrode layer 184 can be information related to a position of the third electrode layer 184 with the third electrode layer 184 on the carrier 120. The positional information associated with the third electrode layer 184 can be information related to the third electrode layer 184 after the third electrode layer 184 has been placed on the carrier 120 (e.g., placed by the third placing device 182) with the carrier 120 in the fifth position 190. For example, as discussed above, the third placing device 182 can place the third electrode layer 184 on the carrier 120 (e.g., on the second electrode layer 155 with the second electrode layer 155 and the first electrode layer 110 on the carrier 120) with the carrier 120 in the fifth position 190. The conveyor device 130 can then move the carrier 120 from the fifth position 190 to the sixth position 192. The alignment device 194 can obtain positional information associated with the third electrode layer 184 with the third electrode layer 184 supported by the carrier 120 and with the carrier 120 in the sixth position 192 or in the fifth position 190. As depicted in FIGS. 1-3, for example, the alignment device 194 can obtain positional information associated with the third electrode layer 184 with the carrier 120 in the sixth position 192. The positional information can be information regarding an angular orientation of the third electrode layer 184 relative to some locator or identifier on the carrier 120. The positional information can be information regarding a distance between an edge of the third electrode layer 184 and some reference (e.g., a boundary between the first portion 415 and the second portion 410 of the carrier 120 or an edge of the second electrode layer 155 on which the third electrode layer 184 is stacked). The positional information could be to position of a center point of the third electrode layer 184 relative to some reference (e.g., a locator or identifier of the carrier 120, an edge of the carrier 120, a center point of the second electrode layer 155 as determined by the alignment device 180). For example, the alignment device 194 can determine a position of a center point of the third electrode layer 184, which can be compared with a position of a center point of the second electrode layer 155 by the computing system 199, for example. A position of a center point of the second electrode layer 155, which can be determined based on positional information associated with the second electrode layer 155 obtained by the alignment device 188, can be compared with a position of a center point of third electrode layer 184 to determine an alignment of the center points, for example. The positional information associated with the third electrode layer 184 can be some other information.

The system 100 can include the third placing device 182 coupled with a control device. For example, the third placing device 182 can be communicably coupled with the computing system 199 as depicted in FIG. 12, among others. The computing system 199 can control or affect a movement of the second placing device 150. For example, the computing system 199 can monitor a position of the third placing device 182 (e.g., an actuator 183 of the third placing device 182) and a position of another object (e.g., the third electrode layer 184, the carrier 120, or some other object). The computing system 199 can provide a command, signal, or instruction to the third placing device 182 or some other placing device (e.g., a fourth placing device) based on the monitored position of the third placing device 182 or another object. For example, the computing system 199 can receive positional information regarding an electrode layer (e.g., the first electrode layer 110, the second electrode layer 155, or the third electrode layer 184) and can command, based on the positional information of one or more electrode layers, the third placing device 182 to move in a particular way. The computing system 199 can cause the third placing device 182 to move in a particular way to lift or place an electrode layer in a particular orientation. For example, the computing system 199 can cause the actuator 183 of the third placing device 182 or an actuator of another placing device to articulate (e.g., rotate, bend, or move) in a particular manner such that the actuator of the placing device lifts the electrode layer with the actuator in a particular orientation (e.g., with the actuator 183 or a portion of the actuator 183 perpendicular to the third electrode layer 184). The computing system 199 can cause the actuator 183 to articulate (e.g., rotate, bend, or move) in a particular manner such that the actuator 183 can place the third electrode layer 184 with the third electrode layer 184 in a particular orientation (e.g., parallel to the first portion 415 of the carrier 120, parallel to the second electrode layer 155 on which the third electrode layer 184 can be stacked). The computing system 199 can control a speed of a movement of the third placing device 182 or the actuator 183. The computing system 199 can cause the actuator 183 of the third placing device 182 to lift (e.g., grasp, grip, pick) an electrode layer or place (e.g., release, drop, free) an electrode layer.

The system 100 can include the third placing device 182 to place the third electrode layer 184 based on positional information associated with the third electrode layer 184. For example, the alignment device 188 can obtain positional information associated with the third electrode layer 184 with the third electrode layer 184 supported on the surface 186 or on a stack of third electrode layers positioned on the surface 186. The alignment device 188 can communicate the positional information associated with the third electrode layer 184 to the computing system 199 or other control device. The third placing device 182 can, based on the positional information associated with the third electrode layer 184 from the alignment device 188, lift the third electrode layer 184 with the third placing device 182 or the actuator 183 of the third placing device 182 in a particular orientation. For example, the computing system 199 can, based on the positional information associated with the third electrode layer 184 provided by the alignment device 188, transmit a command or signal to the third placing device 182 to cause the third placing device 182 to lift the third electrode layer 184 with the actuator 183 in a particular orientation. The third placing device 182 can lift the third electrode layer 184 in a particular orientation based on the positional information associated with the third electrode layer 184 obtained by the alignment device 188 such that a position of at least one edge or a center point of the third electrode layer 184 is known (by the computing system 199 or otherwise). The third placing device 182 can place the third electrode layer 184 on the carrier 120 in a particular orientation or with the third placing device 182 or the actuator 183 of the third placing device 182 in a particular orientation based on the positional information associated with the third electrode layer 184 from the alignment device 188. For example, the computing system 199 can, based on the positional information of the third electrode layer 184 from the alignment device 188, transmit a command or signal to the third placing device 182 to cause the third placing device 182 to place the third electrode layer 184 on the carrier 120 with the third electrode layer 184, the third placing device 182, or the actuator 183 in a particular orientation or in a particular manner.

The system 100 can include the third placing device 182 to place the third electrode layer 184 on the second electrode layer 155 based on positional information regarding the second electrode layer 155 or the first electrode layer 110. For example, the alignment device 145 can obtain positional information associated with the first electrode layer 110 and the alignment device 180 can obtain positional information associated with the second electrode layer 155. The alignment device 145 can obtain positional information associated with the first electrode layer 110 with the carrier 120 in the second position 140. For example, the alignment device 145 can obtain positional information associated with the first electrode layer 110 before the second placing device 150 places the second electrode layer 155 on the first electrode layer 110. The alignment device 180 can obtain positional information associated with the second electrode layer 155 with the carrier 120 in the fourth position 175. For example, the alignment device 180 can obtain positional information associated with the second electrode layer 155 before the third placing device 182 places the third electrode layer 184 on the second electrode layer 155. As noted above, the positional information associated with the first electrode layer 110 or the second electrode layer 155 can be information related to a position of a center point of the first electrode layer 110 or the second electrode layer 155, a position of at least one edge of the first electrode layer 110 or the second electrode layer 155, a position of the first electrode layer 110 or the second electrode layer 155 relative to some reference (e.g., a point or edge of the carrier 120), or some other information associated with a position or dimension of the first electrode layer 110 or the second electrode layer 155, respectively. The third placing device 182 can place the third electrode layer 184 on the second electrode layer 155 in a particular orientation or in a particular manner based on the previously-obtained positional information associated with the second electrode layer 155 or the first electrode layer 110. For example, the third placing device 182 can place the third electrode layer 184 on the second electrode layer 155 with a center point of the second electrode layer 155 or a center point of the first electrode layer 110 aligned or substantially aligned (e.g., within 1 cm, within 1 mm, within less than 1 mm) with a center point of the third electrode layer 184. The third placing device 182 can place the third electrode layer 182 on the second electrode layer 155 with an edge of the second electrode layer 155 or an edge of the first electrode layer 110 aligned or substantially aligned (e.g., within 1 cm, within 1 mm, within less than 1 mm) with an edge of the third electrode layer 184.

The system 100 can include the third placing device 182 to place the third electrode layer 184 on the second electrode layer 155 based on positional information associated with the first electrode layer 110, positional information associated with the second electrode layer 155, or positional information associated with the third electrode layer 184. For example, positional information associated with the first electrode layer 110 can be obtained by the alignment device 145 with the first electrode layer 110 on the carrier 120 and with the carrier 120 in the second position 140. Positional information associated with the second electrode layer 155 can be obtained by the alignment device 180 with the second electrode layer 155 on the carrier 120 with the carrier 120 in the fourth position 175. The computing system 199 can cause the third placing device 182 to lift the third electrode layer 184 in a particular manner based on the positional information associated with the third electrode layer 184 and therefore place the third electrode layer 184 with the third electrode layer 184 grasped (e.g. held, retained, gripped) by the actuator 183 in a particular manner. For example, the third placing device 182 can grasp the third electrode layer 184 with an edge or a center point of the third electrode layer 184 in a particular orientation based on the positional information associated with the third electrode layer 184 obtained by the alignment device 188. The third placing device 184 can also place the third electrode layer 184 on the second electrode layer 155 based on the positional information associated with the first electrode layer 110 or positional information associated with the second electrode layer 155, as discussed above. The third placing device 182 can place the third electrode layer 184 on the second electrode layer 155 with a center point of the second electrode layer 155 aligned with a center point of the third electrode layer 184 based on the positional information associated with the second electrode layer 155 or the positional information associated with the second electrode layer 155. The third placing device 182 can place the third electrode layer 184 on the second electrode layer 155 with an edge of the second electrode layer 155 or an edge of the first electrode layer 110 aligned with an edge of the third electrode layer 184 based on the positional information associated with the first electrode layer 110, positional information associated with the second electrode layer 155, or positional information associated with the third electrode layer 184.

The third electrode layer 184 can be an electrode layer for a battery. For example, the third electrode layer 184 can be or include a current collector foil (e.g., copper foil, aluminum foil, or some other foil) with a battery active material (e.g., a cathode material or an anode material) laminated with at least one side of the current collector foil. For example, the third electrode layer 184 can be an anode electrode including an anode battery active material laminated with, bonded with, or integrated with one or two sides of a copper current collector foil. The third electrode layer 184 can be a singulated (e.g., individual, separated, single) electrode layer including a tab. The tab, which can be a portion of current collector foil uncoated with a battery active material, can protrude or extend from an edge of the third electrode layer 184 to electrically couple the third electrode layer 184 with another electrode layer (e.g., an adjacent electrode layer in an electrode layer stack) or another current collector (e.g., a terminal for a battery cell). The third electrode layer 184 can be a monocell electrode layer. For example, the third electrode layer 184 can include a separator layer (e.g., electrolyte layer) laminated with, bonded with, or integrated with at least one side of the third electrode layer 184. The separator layer can be a polymeric or other electrolyte layer that can subsequently be wetted (e.g., exposed to, at least partially saturated by) liquid electrolyte. The third electrode layer 184 can be a solid state electrode including a solid-state electrolyte material. For example, the third electrode layer 184 can be a cathode layer having a solid-state electrode material and a solid-state electrolyte material such that the cathode layer can be stacked against a lithium metal foil anode with no additional separator layer disposed therebetween. The third electrode layer 184 can be an electrode layer without a separator layer laminated with, bonded with, or integrated with one side of the third electrode layer 184 (e.g., to a battery active material layer of the third electrode 184). For example, the third electrode layer 184 can be or include a current collector material coated with a battery active material, and a separate separator layer can be provided between the third electrode layer 184 and an adjacent electrode layer (e.g., a second electrode layer 155 or a fourth electrode layer 230) when the third electrode layer 184 is stacked to create an electrode layer stack 250.

The third electrode layer 184 can be an electrolyte layer. For example, rather than being an electrode layer having battery active material (e.g., a cathode layer or an anode layer), the third electrode layer 184 can be an electrolyte layer, such as a solid-state electrolyte layer. The third electrode layer 184 can be a singulated, solid-state electrolyte layer that can be placed on the second electrode layer 155 and underneath a subsequent electrode layer (e.g., a fourth electrode layer 230) such that the third electrode layer 184 can be an electrolyte layer positioned between two electrode layers. For example, the third electrode layer 184 can be singulated sheet of separator material that includes an electrolyte material (e.g., a solid-state electrolyte sheet) or a separator material that can subsequently be wetted with (e.g., exposed to, at least partially saturated with) a liquid electrolyte material.

The third electrode layer 184 can provided to the third placing device 182 with the third electrode layer 184 on the surface 186. The surface 186 can be a receptacle (e.g., a bin, a container) or a surface of a table, bench, platform or other object, for example. The third electrode layer 184 can be provided to the third placing device 182 with the third electrode layer 184 on a stack of multiple third electrode layers. For example, a stack of third electrode layers can be provided to the third placing device 182 with the stack of third electrode layers on the surface 186 of a receptacle. The third electrode layer 184 can be the top-most third electrode layer of the stack of multiple third electrode layers such that the third electrode layer 184 is accessible by the third placing device 182. For example, the third placing device 182 can grab (e.g., grasp, lift, grip, clasp, hold, pick-up, or otherwise lift) the third electrode layer 184 with the third electrode layer 184 positioned on a stack of multiple third electrode layers on the surface 186.

As depicted in FIG. 2, among others, the system 100 can include at least one alignment device 210 to obtain positional information associated with a fourth electrode layer 230. For example, a fourth placing device (not shown) can place a fourth electrode layer 230 on the third electrode layer 184 to produce an electrode layer stack 250. The system 100 can include at least one alignment device 210 to obtain positional information associated with the fourth electrode layer 230 with the fourth electrode layer 230 on the carrier 120 (e.g., positioned on the third electrode layer 184 with the third electrode layer 184, the second electrode layer 155, and the first electrode layer 110 on the carrier 120). The alignment device 210 can obtain positional information associated with the fourth electrode layer 230 or some other layer with the fourth electrode layer 230 positioned on a carrier 120 with the carrier 120 in the eighth position 205. The alignment device 210 can be or include an optical sensor. For example, the alignment device 210 can be or include at least one camera, at least one laser sensor, at least one infrared sensor, or some other sensor to measure one or more parameters regarding a position of the fourth electrode layer 230.

The positional information associated with the fourth electrode layer 230 can be information related to a position of the fourth electrode layer 230 with the fourth electrode layer 230 on the carrier 120. The positional information associated with the fourth electrode layer 230 can be information related to the fourth electrode layer 230 after the fourth electrode layer 230 has been placed on the carrier 120 (e.g., placed by the fourth placing device) with the carrier 120 in the seventh position 200. For example, the fourth placing device can place the fourth electrode layer 230 on the carrier 120 (e.g., on the third electrode layer 184 with the third electrode layer 184, the second electrode layer 155, and the first electrode layer 110 on the carrier 120) with the carrier 120 in the seventh position 200. The conveyor device 130 can then move the carrier 120 from the seventh position 200 to the eighth position 205. The alignment device 210 can obtain positional information associated with the fourth electrode layer 230 with the fourth electrode layer 230 supported by the carrier 120 and with the carrier 120 in the eighth position 205 or in the seventh position 200. As depicted in FIG. 2, for example, the alignment device 210 can obtain positional information associated with the fourth electrode layer 230 with the carrier 120 in the eighth position 205. The positional information can be information regarding an angular orientation of the fourth electrode layer 230 relative to some locator or identifier on the carrier 120. The positional information can be information regarding a distance between an edge of the fourth electrode layer 230 and some reference (e.g., a boundary between the first portion 415 and the second portion 410 of the carrier 120 or an edge of the third electrode layer 184 on which the fourth electrode layer 230 is stacked). The positional information could be to position of a center point of the fourth electrode layer 230 relative to some reference (e.g., a locator or identifier of the carrier 120, an edge of the carrier 120, a center point of the third electrode layer 184 as determined by the alignment device 194). For example, the alignment device 210 can determine a position of a center point of the fourth electrode layer 230, which can be compared with a position of a center point of the third electrode layer 184 by the computing system 199, for example. A position of a center point of the third electrode layer 184, which can be determined based on positional information associated with the third electrode layer 184 obtained by the alignment device 194, can be compared with a position of a center point of fourth electrode layer 230 to determine an alignment of the center points, for example. The positional information associated with the fourth electrode layer 230 can be some other information.

The system 100 can include at least one alignment device 225 to obtain positional information associated with a fifth electrode layer 235. For example, a fifth placing device (not shown) can place a fifth electrode layer 235 on the fourth electrode layer 230 to produce an electrode layer stack 250. The system 100 can include at least one alignment device 225 to obtain positional information associated with the fifth electrode layer 235 with the fifth electrode layer 235 on the carrier 120 (e.g., positioned on the fourth electrode layer 230 with the fourth electrode layer 230, the third electrode layer 184, the second electrode layer 155, and the first electrode layer 110 on the carrier 120). The alignment device 225 can obtain positional information associated with the fifth electrode layer 235 or some other layer with the fifth electrode layer 235 positioned on a carrier 120 with the carrier 120 in the tenth position 220. The alignment device 225 can be or include an optical sensor. For example, the alignment device 225 can be or include at least one camera, at least one laser sensor, at least one infrared sensor, or some other sensor to measure one or more parameters regarding a position of the fifth electrode layer 235.

The positional information associated with the fifth electrode layer 235 can be information related to a position of the fifth electrode layer 235 with the fifth electrode layer 235 on the carrier 120. The positional information associated with the fifth electrode layer 235 can be information related to the fifth electrode layer 235 after the fifth electrode layer 235 has been placed on the carrier 120 (e.g., placed by the fifth placing device) with the carrier 120 in the ninth position 215. For example, the fifth placing device can place the fifth electrode layer 235 on the carrier 120 (e.g., on the fourth electrode layer 230 with the fourth electrode layer 230, the third electrode layer 184, the second electrode layer 155, and the first electrode layer 110 on the carrier 120) with the carrier 120 in the ninth position 215. The conveyor device 130 can then move the carrier 120 from the ninth position 215 to the tenth position 220. The alignment device 225 can obtain positional information associated with the fifth electrode layer 235 with the fifth electrode layer 235 supported by the carrier 120 and with the carrier 120 in the tenth position 220 or in the ninth position 215. As depicted in FIG. 2, for example, the alignment device 225 can obtain positional information associated with the fifth electrode layer 235 with the carrier 120 in the tenth position 220. The positional information can be information regarding an angular orientation of the fifth electrode layer 235 relative to some locator or identifier on the carrier 120. The positional information can be information regarding a distance between an edge of the fifth electrode layer 235 and some reference (e.g., a boundary between the first portion 415 and the second portion 410 of the carrier 120 or an edge of the fourth electrode layer 230 on which the fifth electrode layer 235 is stacked). The positional information could be to position of a center point of the fifth electrode layer 235 relative to some reference (e.g., a locator or identifier of the carrier 120, an edge of the carrier 120, a center point of the fourth electrode layer 230 as determined by the alignment device 210). For example, the alignment device 225 can determine a position of a center point of the fifth electrode layer 235, which can be compared with a position of a center point of the fourth electrode layer 230 by the computing system 199, for example. A position of a center point of the fourth electrode layer 230, which can be determined based on positional information associated with the fourth electrode layer 230 obtained by the alignment device 210, can be compared with a position of a center point of fifth electrode layer 235 to determine an alignment of the center points, for example. The positional information associated with the fifth electrode layer 235 can be some other information.

Figure 9:
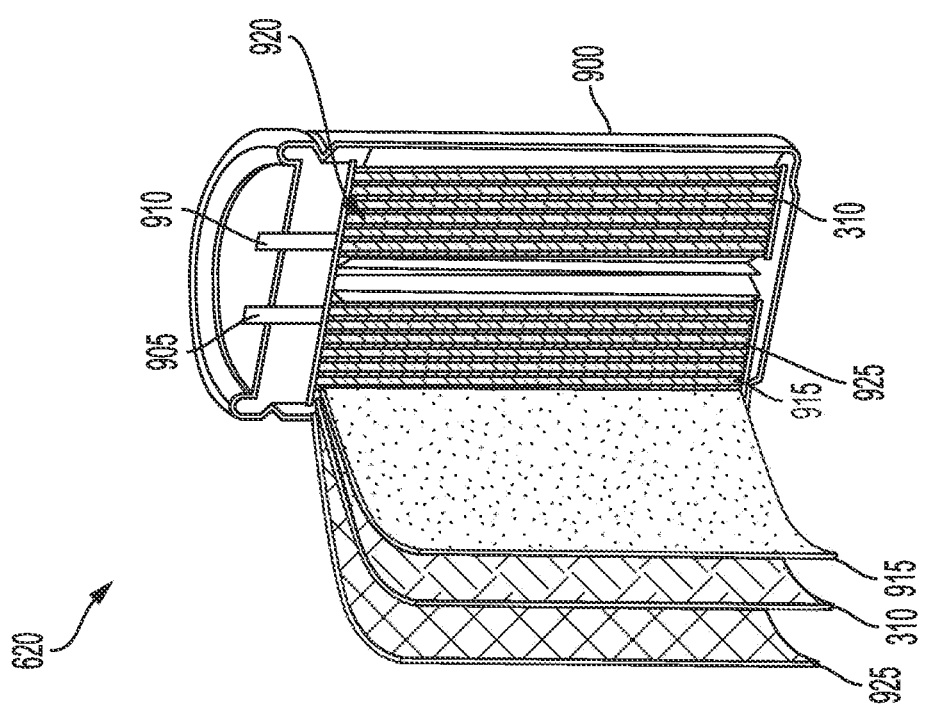
FIG. 9 depicts a cross sectional view of an example battery cell, in accordance with some aspects.
Figure 10:
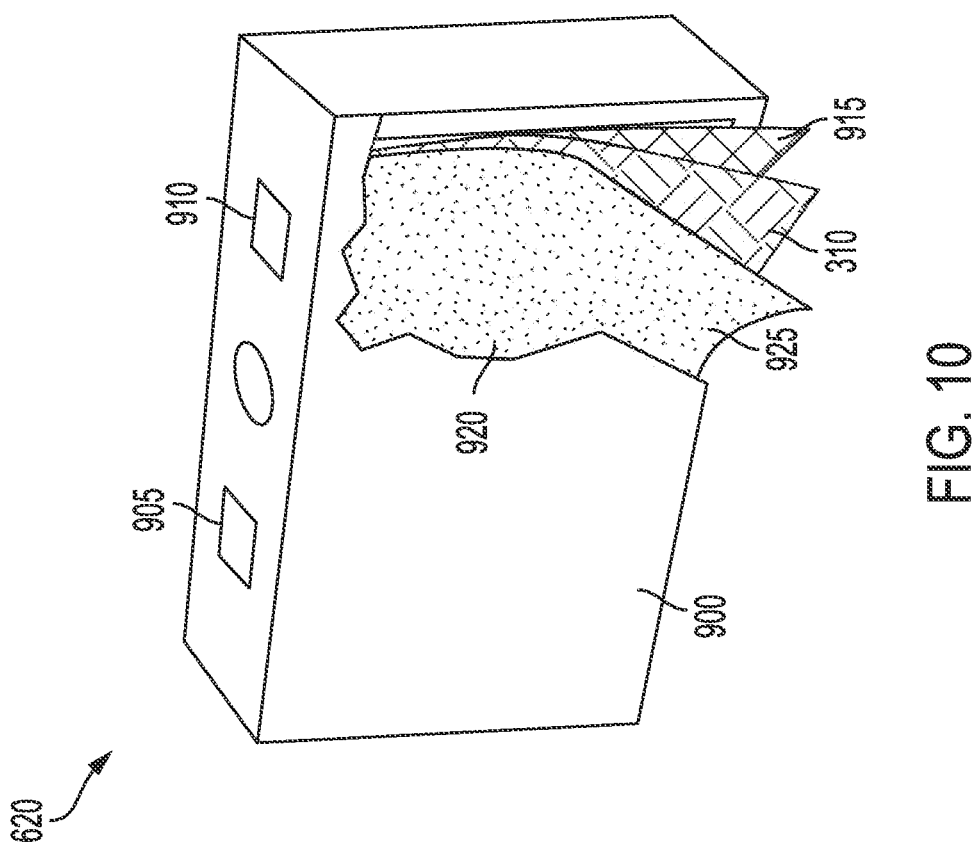
FIG. 10 depicts a cross sectional view of an example battery cell, in accordance with some aspects.
Figure 11:
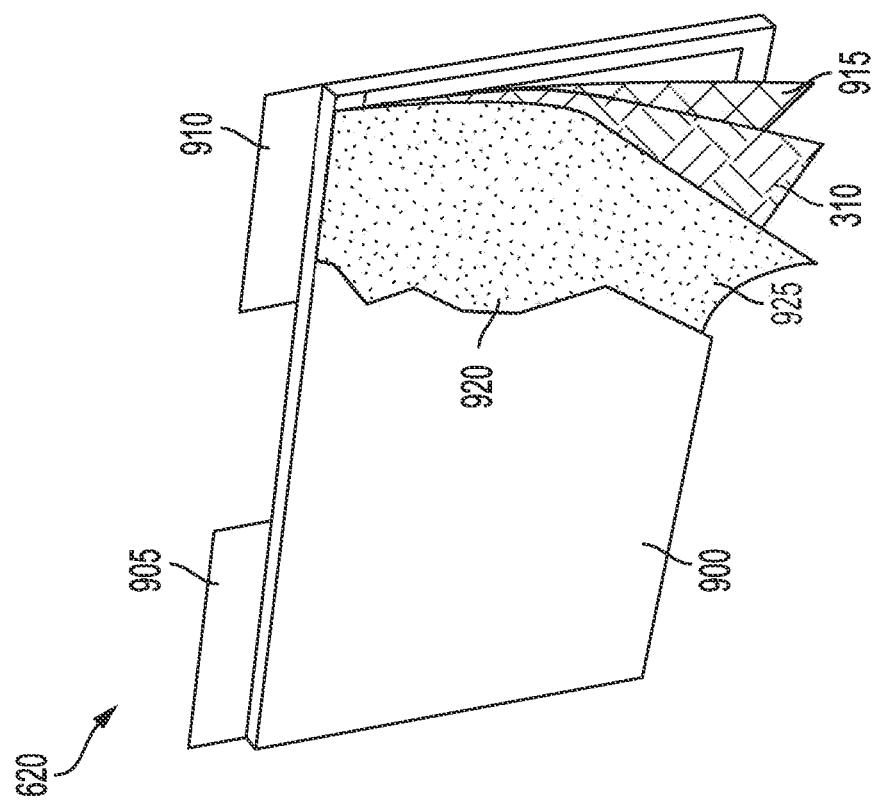
FIG. 11 depicts a cross sectional view of an example battery cell, in accordance with some aspects.

The system 100 can include at least one removal device 240 to remove an electrode layer stack 250. For example, the system 100 can produce an electrode layer stack 250 including multiple electrode layers (e.g., a first electrode layer 110, a second electrode layer 155, a third electrode layer 184, a fourth electrode layer 230, a fifth electrode layer 235, or other electrode layers) in a stack (e.g., layered on top of each other). The electrode layer stack 250 can be an electrode layer stack for a battery cell, such as a battery cell for an electric vehicle or other device. The electrode layer stack 250 can include fewer than ten electrode layers, between ten and fifty electrode layers, between fifty and one hundred electrode layers, or greater than one hundred electrode layers. The removal device 240 can remove the electrode layer stack 250 from the conveyor device 130 once the stack is complete (e.g., once a final electrode layer has been placed on the electrode layer stack 250. For example, the removal device 240 can lift the electrode layer stack 250 from the carrier 120 on the conveyor device 130. The removal device 240 can place the electrode layer stack 250 in a container 245 (e.g., a receptacle, a bin, a battery cell housing, a battery module, a battery pack or some other storage device). For example, the removal device 240 can place the electrode layer stack 250 in the container 245 so that the electrode layer stack 250 can be transported or provided elsewhere for another operation (e.g., for placement within a battery cell housing, such as the housing 900 as depicted in FIGS. 9-11, among others). The removal device 240 can be positioned at an end of the conveyor device 130 (e.g., proximate a tenth position 220, an eighth position 205, or some other final position).

The removal device 240 can be placed elsewhere along the conveyor device 130 to remove a partially-completed electrode layer stack 250. For example, the removal device 240 or some other device can reject an electrode layer stack 250. The removal device 240 can reject an electrode layer stack based on positional information associated with one of the electrode layers, such as positional information associated with the first electrode layer 110, positional information associated with the second electrode layer 155, positional information associated with the third electrode layer 184, positional information associated with the fourth electrode layer 230, positional information associated with the fifth electrode layer 235, or some other positional information. For example, the computing system 199 can determine, based on positional information about at least one electrode layer that at least one electrode layer is misaligned, was improperly placed on the electrode layer stack, or exhibits some other defect. The removal device 240 can lift (e.g., remove) the electrode layers stack 250 from the carrier 120 on the conveyor device 130 and deposit the rejected electrode layer stack 250 elsewhere (e.g., a container 245 for further processing or discarding).

The removal device 240 can be a robotic device, such as a pick-and-place robot, a robotic arm, or some other robotic device. The removal device 240 can lift an electrode layer stack 250 from a first location, move the electrode layer stack 250 to a second location, and place the electrode layer in the second position. For example, the removal device 240 can lift the electrode layer stack 250 from a carrier 120 on the conveyor substrate 134 of the conveyor device 130. The removal device 240 can move the electrode layer stack 250 from the first location to a second location, such as the container 245 with the container 245 positioned at an end of the conveyor device 130 or otherwise (e.g., next to an intermediate position of the conveyor device 130). The removal device 240 can place the electrode layer stack 250 in the second position such that the electrode layer stack 250 is positioned on or within the container 245.

The removal device 240 can be or include an actuator 242. For example, the removal device 240 can include an actuator 242, such as a gripper, robotic clamp, pneumatic gripping device (e.g., a flexible or soft vacuum-gripper), or other actuator to lift the electrode layer stack 250 or place the electrode layer stack 250. The actuator 242 can lift the electrode layer stack 250 (e.g., a completed electrode layer stack 250 or a partially completed electrode layer stack 250), from a first location, such as a carrier 120. The actuator 242 can place the electrode layer stack 250 at a second location, such as the container 245. The actuator 242 can grip (e.g., grasp, hold, retain) electrode layer stack 250 as the removal device 240 moves. For example, the removal device 240 can lift the electrode layer stack 250 with the removal device 240 in a first position. The removal device 240 can place the electrode layer stack 250 with the removal device 240 in second position. The removal device 240 can grip the electrode layer stack 250 as the removal device 240 moves from the first position (e.g., a position to lift the electrode layer stack 250 with the electrode layer stack 250 in the first location) to the second position (e.g., a position to place the electrode layer stack 250 at a second location, such as on or within the container 245). The actuator 242 can articulate relative to the removal device 240. For example, the actuator 242 can be rotatably coupled with the removal device 240 such that the angular orientation of the actuator 242 relative to the removal device 240 can be manipulated.

As depicted in FIG. 3, among others, a system 300 for creating an electrode layer stack can include the conveyor device 130 coupled with at least one carrier 120. As discussed above, a first placing device 105, a second placing device 150, or other placing devices can place an electrode layer (e.g., the first electrode layer 110, the second electrode layer 155, or other layers) on the carrier 120 with the carrier 120 in various positions (e.g., the first position 135, the third position 170, or some other position) to build a stack of multiple electrode layers. The system 300 can also include at least one alignment device to obtain positional information regarding an electrode layer. For example, the system 300 can include the alignment device 145 to obtain positional information about the first electrode layer 110 with the first electrode layer 110 on a carrier 120 in the second position 140. The second placing device 150 can, for example, place the second electrode layer 155 on the first electrode layer 110 based on the positional information of the first electrode layer 110. As shown in FIG. 3, among others, additional placing devices or alignment devices can be included to produce an electrode layer stack having multiple electrode layers.

The system 300 can include a separator layer positioned between the first electrode layer 110 and an adjacent surface or layer. For example, the system 300 can include a first separator layer 310 positioned between the carrier 120 and the first electrode layer 110. The first separator layer 310 can be provided to the system 300 in a rolled form. For example, a roll 305 of separator material can be provided to the system and unrolled to form the separator layer 310. The separator layer 310 can be a continuous layer of separator material. The separator material can be a polymeric or other material that can subsequently be wetted with (e.g., exposed to, at least partially saturated) a liquid electrolyte material. The first separator layer 310 can be positioned between the first electrode layer 110 and the carrier 120 (e.g., between the first electrode layer 110 and the first portion 415 of the carrier 120. The first separator layer 310 can be provided over the carrier 120 with the carrier in the first position 135 before the first placing device 105 can place the first electrode layer 110 on the carrier 120.

The system 300 can include a separator layer 310 positioned between the first electrode layer 110 and the second electrode layer 155. For example, the system 300 can include the second electrode layer 155 placed on the first electrode layer 110 with a second separator layer 310 positioned between the first electrode layer 110 and the second electrode layer 155. The second separator layer 310 can be provided to the system 300 via a roll 305 of separator material. The second separator layer 310 can be provided to a carrier 120 with the carrier 120 in the third position 170. For example, the second separator layer 310 can be provided to carrier 120 when the carrier 120 is positioned in the third position 170 with the first separator layer 310 and the first electrode layer 110 stacked thereon. The second separator layer 310 can be provided over the first electrode layer 110. The second separator layer 310 can be provided over the first electrode layer 110 before the second placing device 150 places the second electrode layer 155 on the first electrode layer 110 such that the second separator layer 310 can be positioned between the first electrode layer 110 and the second electrode layer 155.

The system 300 can include a separator layer 310 positioned between the second electrode layer 155 and the third electrode layer 184. For example, the system 300 can include the third electrode layer 184 placed on the second electrode layer 155 with a third separator layer 310 positioned between the second electrode layer 155 and the third electrode layer 184. The second separator layer 310 can be provided to the system 300 via a roll 305 of separator material. The second separator layer 310 can be provided to a carrier 120 with the carrier 120 in the fifth position 190. For example, the third separator layer 310 can be provided to carrier 120 when the carrier 120 is positioned in the fifth position 190 with the first separator layer 310, first electrode layer 110, second separator layer 310, and second electrode layer 155 stacked thereon. The third separator layer 310 can be provided over the second electrode layer 155. The third separator layer 310 can be provided over the second electrode layer 155 before the third placing device 182 places the third electrode layer 184 on the second electrode layer 155 such that the third separator layer 310 can be positioned between the second electrode layer 155 and the third electrode layer 184.

The system 300 can include a separator layer 310 positioned between the third electrode layer 184 and the fourth electrode layer 230. For example, the system 300 can include the fourth electrode layer 230 placed on the third electrode layer 184 with a fourth separator layer 310 positioned between the third electrode layer 184 and the fourth electrode layer 230. The third separator layer 310 can be provided to the system 300 via a roll 305 of separator material. The third separator layer 310 can be provided to a carrier 120 with the carrier 120 in the seventh position 200. For example, the fourth separator layer 310 can be provided to carrier 120 when the carrier 120 is positioned in the seventh position 200 with the first separator layer 310, the first electrode layer 110, the second separator layer 310, the second electrode layer 155, the third separator layer 310, and the third electrode layer 184 stacked thereon. The fourth separator layer 310 can be provided over the third electrode layer 184. The fourth separator layer 310 can be provided over the third electrode layer 184 before a fourth placing device places the fourth electrode layer 230 on the third electrode layer 184 such that the fourth separator layer 310 can be positioned between the third electrode layer 184 and the fourth electrode layer 230.

The system 300 can include at least one tensioning device 315 and at least one holding device 320 to provide a material (e.g., a separator layer 310 or a continuous web of electrode material) to the carrier 120 or on an adjacent layer (e.g., a separator layer 310 or an electrode layer). For example, the roll 305 of separator material can be unrolled to form the separator layer 310. The separator layer 310 can extend from the roll 305 towards the carrier 120. For example, the first separator layer 310 can extend from the roll 305 and towards the carrier 120. A subsequent layer (e.g., an electrode layer) can be placed on the layer in rolled form (e.g., the separator layer 310) between the tensioning device 315 and the holding device 320. For example, the tensioning device 315 can be positioned to one side of a carrier 120 and the holding device 320 can be positioned to another side of the carrier 120 such that a layer can be placed between the holding device 320 and the tensioning device 315.

The tensioning device 315 or the holding device 320 can be web handling devices (e.g., rotatable rollers, shafts, bearings, or other members) to direct the movement of the separator layer 310. For example, the tensioning device 315 can be fixed (e.g., stationary) relative to a position (e.g., the first position 135) of the conveyor device 130 to direct the separator layer 310 towards the carrier 120. The tensioning device 315 can be moveable in a direction at least partially opposed to the first direction 132 (e.g., an opposite direction, a direction having a component vector opposite the first direction 132). The holding device 320 can be fixed (e.g., stationary) relative to a position (e.g., the first position 135) of the conveyor device 130 to hold (e.g., maintain) a position of the separator layer 310 relative to the carrier 120. For example, the holding device 320 can be positioned in a plane with the tensioning device 315, where the plane is parallel or substantially parallel (e.g., ±5%) with the first portion 415 of the carrier 120 or the conveyor substrate 134. The tensioning device 315 and the holding device 320 can cause the separator layer 310 to extend over the carrier 120 with the separator layer 310 parallel or substantially parallel (e.g., ±5%) with the conveyor substrate 134, the first portion 415 of the carrier 120, or the plane in which the tensioning device 315 and the holding device 320 are positioned. The tensioning device 315 or the holding device 320 can hold (e.g., maintain, keep, retain) the separator layer 310 in that parallel orientation. The tensioning device 315 can apply a tension to the separator layer 310 such that the separator layer 310 can extend taut over the carrier 120 or over another layer (e.g., an electrode layer) without creases, folds, ripples, waviness, or any other deformity. As depicted in FIG. 3, among others, the system 300 can include multiple tensioning devices 315 and holding devices to provide multiple layers of material (e.g., separator layers 310, electrode layers) to form an electrode layer stack 250. A pair of tensioning device 315 and holding devices 320 associated with a single layer (e.g., a separator layer 310) can be spaced apart from the conveyor substrate 134 so that the layer can be provided at an appropriate height (e.g., to provide space for previously stacked layers beneath the single layer.

Each of the first separator layer 310, the second separator layer 310, the third separator layer 310, the fourth separator layer 310, or another separator layer can be a continuous web (e.g., sheet, layer, film) of separator material, where each layer 310 includes at least one portion (e.g., subsection, length, segment, area). For example, each of the first separator layer 310, the second separator layer 310, the third separator layer 310, or the fourth separator layer 310 can include a first portion, a second portion, a third portion, or other portions, where each portion can be associated with a particular electrode layer stack and can be connected (e.g., continuous with) adjacent portions of the layer 310. As noted above, the carrier 120 can move in the first direction 132 by the conveyor device 130, where the carrier 120 can move from a first position 135, to a second position 140, to a third position 170, and so on. A portion of the first separator layer 310, which can be placed on the carrier 120 with the carrier in the first position 135, can thus move with the carrier 120 as the carrier 120 moves from the first position 135 to the second position 140, from the second position 140 to the third position 170, and so on. For example, the first separator layer 310, the second separator layer 310, the third separator layer 310, or the fourth separator layer 310 can be pulled (e.g., via the tensioning device 315, via the holding device 320, via a weight of placed electrode layers under gravity, or otherwise) in the first direction 132 as the respective carrier 120 moves.

When the first separator layer 310, the second separator layer 310, the third separator layer 310, or the fourth separator layer 310 extend in the first direction 132, the first separator layer 310, the second separator layer 310, the third separator layer 310, or the fourth separator layer 310 can extend over multiple carriers 120. Each of the multiple carriers 120 can be associated with an individual electrode layer stack. For example, as discussed above, when a first carrier 120 associated with a first electrode layer stack advances from the first position 135 to the second position 140, a second carrier 120 moves behind the first carrier 120 into the first position 135, where a second electrode layer stack can be formed, and so on. A first portion of the first separator layer 310 can be positioned over a first carrier 120 associated with a first electrode layer stack while a second portion of the first separator layer 310 can be associated with a second electrode layer stack.

The system 300 can include a separator layer 310 including a first portion of the separator layer 310 positioned between the first electrode layer 110 and a first carrier 120 associated with a first electrode layer stack and a second portion of the separator layer 310 positioned between the a second first electrode layer 110 and the second carrier 120. For example, the separator layer 310 can be the first separator layer 310 as discussed herein. The separator layer 310 can be provided over a first carrier 120. The first placing device 105 can place the first electrode layer 110 on the first carrier 120 with the first portion of the separator layer 310 positioned between the first carrier 120 and the first electrode layer 110. The first carrier 120 can move from the first position 135 to the second position 140, and a second carrier 120 can move into the first position. A second portion of the separator layer 310 can be provided over the second carrier 120. The first placing device 105 can place a second first electrode layer 110 (e.g., another first electrode layer 110) on the second carrier 120 with the second portion of the separator layer 310 positioned between the second carrier 120 and the second first electrode layer 110. The first portion of the separator layer 310 and the second portion of the separator layer can be continuous.

The system 300 can include a separator layer 310 including a first portion of the separator layer 310 positioned between the second electrode layer 155 and the first electrode layer 110 associated with a first electrode layer stack and a second portion of the separator layer 310 positioned between the another second electrode layer 155 (e.g., a fourth electrode layer) and another first electrode layer 110 (e.g., a third electrode layer). For example, the separator layer 310 can be the second separator layer 310 as discussed herein. The separator layer 310 can be provided over the first electrode layer 110 with the first electrode layer supported by a first carrier 120. The second placing device 150 can place the second electrode layer 155 on the first electrode layer 110 with the first portion of the separator layer 310 positioned between the first electrode layer 110 and the second electrode layer 155. The first carrier 120 can move from the third position 170 to the fourth position 175, and a second carrier 120 can move from the second position 140 into the third position 170. A second portion of the separator layer 310 can be provided over the other first electrode layer 110 (e.g., the third electrode layer) with the other first electrode layer 110 supported by the second carrier 120. The second placing device 150 can place the other second electrode layer 155 (e.g., the fourth electrode layer) on the other first electrode layer 110 (e.g., the third electrode layer) with the second portion of the separator layer 310 positioned between the other first electrode layer 110 and the other second electrode layer 155. The first portion of the separator layer 310 and the second portion of the separator layer can be continuous.

The system 300 can include a separator layer 310 including a first portion of the separator layer 310 positioned between the third electrode layer 184 (e.g., a fifth electrode layer) and the second electrode layer 155 associated with a first electrode layer stack and a second portion of the separator layer 310 positioned between the another third electrode layer 184 (e.g., a sixth electrode layer) and another second electrode layer 155 (e.g., a fourth electrode layer). For example, the separator layer 310 can be the third separator layer 310 as discussed herein. The separator layer 310 can be provided over the second electrode layer 155 with the second electrode layer 155 supported by a first carrier 120. The third placing device 182 can place the third electrode layer 184 on the second electrode layer 155 with the first portion of the separator layer 310 positioned between the second electrode layer 155 and the third electrode layer 184. The first carrier 120 can move from the fifth position 190 to the sixth position 192, and a second carrier 120 can move from the fourth position 175 into the fifth position 190. A second portion of the separator layer 310 can be provided over the other second electrode layer 155 (e.g., the fourth electrode layer) with the other second electrode layer 155 supported by the second carrier 120. The third placing device 182 can place the other third electrode layer 184 (e.g., the sixth electrode layer) on the other second electrode layer 155 (e.g., the fourth electrode layer) with the second portion of the separator layer 310 positioned between the other second electrode layer 155 and the other third electrode layer 184. The first portion of the separator layer 310 and the second portion of the separator layer can be continuous.

The system 300 can include a separator layer 310 including a first portion of the separator layer 310 positioned between the fourth electrode layer 230 (e.g., a seventh electrode layer) and the third electrode layer 184 associated with a first electrode layer stack and a second portion of the separator layer 310 positioned between the another fourth electrode layer 184 (e.g., an eighth electrode layer) and another third electrode layer 184 (e.g., a sixth electrode layer). For example, the separator layer 310 can be the fourth separator layer 310 as discussed herein. The separator layer 310 can be provided over the third electrode layer 184 with the third electrode layer 184 supported by a first carrier 120. A fourth placing device can place the fourth electrode layer 230 on the third electrode layer 184 with the first portion of the separator layer 310 positioned between the third electrode layer 184 and the fourth electrode layer 230. The first carrier 120 can move from the seventh position 200 to the eighth position 205, and a second carrier 120 can move from the sixth position 192 into the seventh position 200. A second portion of the separator layer 310 can be provided over the other third electrode layer 184 (e.g., the sixth electrode layer) with the other third electrode layer 184 supported by the second carrier 120. The fourth placing device can place the other fourth electrode layer 230 (e.g., the eighth electrode layer) on the other third electrode layer 184 (e.g., the sixth electrode layer) with the second portion of the separator layer 310 positioned between the other third electrode layer 184 and the other fourth electrode layer 230. The first portion of the separator layer 310 and the second portion of the separator layer can be continuous.

The system 300 can include at least one cutting device 325 to cut a separator layer 310. For example, because one or more of the first separator layer 310, the second separator layer 310, the third separator layer 310, the fourth separator layer 310, or another separator layer can be a continuous sheet (e.g., web, film, layer), a cutting device 325 can cut the continuous separator layers 310 between adjacent electrode layer stacks to form a singulated electrode layer stack, such as the electrode layer stack 250. The cutting device 325 can be a contactless cutting device (e.g., a laser cutting device) or contact-dependent cutting device (e.g., a blade). The cutting device can be positioned proximate an end (e.g., a final position) of the conveyor device 130 where the removal device 240 can remove the completed electrode layer stack 250 from the conveyor device 130. For example, as depicted in FIG. 3, among others, the cutting device 325 can be positioned within or near the ninth position 215 or the tenth position 220. The cutting device 325 can operate to cut the continuous separator layers 310 periodically or at regular intervals. For example, the cutting device 325 can operate to cut the continuous separator layers 310 after the conveyor device 130 completes a move from one position to another. The cutting device 325 can cut the separator layers 310 with the conveyor device 130 paused (e.g., not advancing the conveyor substrate 134). The cutting device 325 can cut the separator layers 310 between adjacent electrode layer stacks to avoid cutting or damaging any electrode layers (e.g., to limit the cutting action exclusively to the separator layers).

The system 100 or the system 300 can include a placing device including the tensioning device or a holding device. For example, rather than placing an electrode layer (e.g., the first electrode layer 110) on the carrier 120 with a robotic placing device 105 that includes an actuator 107 or other mechanism to lift (e.g., grab, grasp) a singulated electrode layer or electrolyte layer, the system 100 or 300 can include a tensioning device 315 or a holding device 320 to provide an electrode layer sheet (e.g., continuous web, layer, film, or ply) to the carrier 120 or to an adjacent electrode layer to form an electrode layer stack. For example, FIG. 3, among others, depicts a first separator layer 310 provided to the carrier 120 via the tensioning device 315 to apply a tension to the separator layer 310 to unroll the separator layer 310 from roll 305 and a holding device 320 to hold the separator layer 310 against the carrier 120. In a similar manner, for example, the system 300 or system 100 can include an electrode layer (e.g., a cathode layer or an anode layer) provided to the carrier 120 via a tensioning device 315 and a holding device 320. For example, the first placing device 105 can be or include the tensioning device 315 and the holding device 320 to apply a tension to the first electrode layer 110 and hold the first electrode layer 110 against the carrier 120. The first placing device 105 can be or include the a tensioning device 315 to apply a tension to the first electrode layer 110 and the holding device 320 to hold the first electrode layer 110 against the carrier 120 with the first electrode layer 110 formed as a continuous or non-singulated electrode layer.

The system 100 or the system 300 can include a solid-state electrode layer. For example, the system 100 or the system 300 can create an electrode layer stack 250 including a solid-state cathode layer. The electrode layer stack 250 can include a solid-state cathode layer and a solid state electrolyte. The electrode layer stack 250 can include an anode layer including an electrolyte (e.g., separator) layer coupled with the anode layer. The electrode layer stack 250 can include an anode layer positioned adjacent to a solid-state electrolyte layer in the electrode layer stack 250. At least one of the solid-state cathode layer or the anode layer (e.g., an anode layer with or without an electrolyte material) can be provided to the system 100 or the system 300 in a rolled form and provided to the carrier 120 or on an adjacent electrode layer via a tensioning device 315 or a holding device 320. Solid state cathode layer with solid state electrolyte and anode layer (with/without electrolyte), where at least one of cathode layer or anode layer is introduced to the system 100 in rolled form. For example, the cathode layer with solid-state electrolyte can be provided to the system via a roll of material. The cathode layer with solid-state electrolyte material can be provided to the carrier 120 or atop another electrode layer via a tensioning device 315 or a holding device 320, for example. The anode layer can be provided to the system 100 in singulated form (e.g., via a robotic placing device 105 having an actuator 107 as discussed herein).

Figure 5:
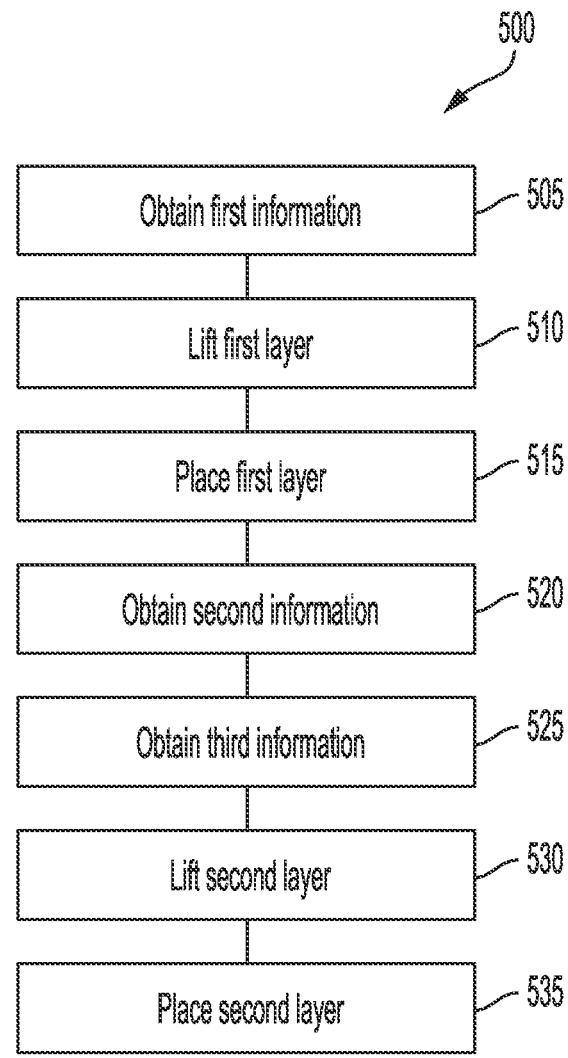
FIG. 5 depicts a flow chart of an example method of manufacturing an electrode layer stack, in accordance with some aspects

FIG. 5, among others, depicts a method 500 for creating an electrode layer stack. For example, the method 500 can be a method of creating the electrode layer stack 250 as herein described. The method 500 can be performed by one or more of system 100 or system 300, or one or more of the components of systems 100 and 300. The ACTS of the method 500 can be performed in the order shown in FIG. 5 or in some other order. The various ACTS of the method 500 can be optionally included or excluded.

The method 500 can include obtaining first information at ACT 505. For example, the method 500 can include obtaining positional information associated with the first electrode layer 110 via the alignment device 125 at ACT 505. The alignment device 125 can obtain positional information associated with the first electrode layer 110 with the first electrode layer 110 supported on the surface 115. The positional information associated with the first electrode layer 110 can be information regarding the a position of an edge, center point, or other point of the first electrode layer 110 relative to some reference (e.g., an edge of the surface 115, global positioning coordinates, or some other reference). The positional information associated with the first electrode layer 110 can be an angular orientation of the first electrode layer 110, such as an angular orientation relative to the surface 115 or some line.

The method 500 can include lifting the first electrode layer 110 at ACT 510. For example, the method 500 can include lifting the first electrode layer 110 from the surface 115 (or from a stack of first electrode layers 110 on the surface 115) with the first placing device 105. The first placing device 105 can be or include an actuator 107 to grasp (e.g., lift, pick up, grip, suction) the first electrode layer 110 to lift the first electrode layer 110 from the surface 115. The first placing device 105 can move the first electrode layer 110 from a first position (e.g., the surface 115) to some other position (e.g., a carrier 120 on the conveyor device 130). The first placing device 105 can lift the first electrode layer 110 based on the positional information associated with the first electrode layer 110 obtained by the alignment device 125 at ACT 505 (e.g., the first positional information). For example, the first placing device 105 can include or be coupled with a control device (e.g., the computing system 199). The first placing device 105 can receive a command or signal to control or modify an operation of the first placing device 105, where the signal can be based on the first positional information. For example, the actuator 107 of the first placing device 105 can lift the first electrode layer 110 with the actuator 107 in a particular orientation (e.g., lift the first electrode layer 110 with the first electrode layer 110 square with or otherwise aligned with the actuator 107).

The method 500 can include placing the first electrode layer 110 at ACT 515. For example, the method 500 can include placing the first electrode layer 110 on the carrier 120 via the first placing device 105. The first placing device 105 can move the first electrode layer 110 from the surface to a carrier 120 positioned in the first position 135 on the conveyor device 130. The first placing device 105 can move the first electrode layer 110 to a position on or above the first portion 415 of the carrier 120 and can release the first electrode layer 110. The first electrode layer 110 can be supported by the carrier 120 on the conveyor substrate 134 of the conveyor device 130 with the first electrode layer 110 placed on the carrier 120.

The method 500 can include obtaining second information at ACT 520. For example, the method 500 can include obtaining positional information associated with the first electrode layer 110 with the first electrode layer 110 supported by the carrier 120. The placing device 105 can place the first electrode layer 110 on the carrier 120 at ACT 510 with the carrier 120 in the first position 135. Once the first electrode layer 110 is placed on the carrier 120, the conveyor device 130 can move the carrier 120 from the first position 135 to the second position 140, for example. The alignment device 145 can obtain positional information associated with the first electrode layer 110 with the first electrode layer 110 supported on the carrier 120 in the second position 140 (e.g., second positional information). The positional information associated with the first electrode layer 110 with the first electrode layer 110 supported on the carrier 120 in the second position 140 can be information regarding a position or orientation of the first electrode layer 110 relative to some reference. For example, the second positional information can be information regarding a position of an edge, corner, center point, position of a tab, or some other feature of the first electrode layer 110 relative to some reference (e.g., an identifier on the carrier 120, global positioning system coordinates, or some other feature). The second positional information can be information regarding an angular orientation of the first electrode layer 110 on the carrier 120, information regarding a defect or blemish on the first electrode layer, a size of the first electrode layer, or some other information.

The method 500 can include obtaining third information at ACT 525. For example, the method 500 can include obtaining positional information associated with the second electrode layer 155 (e.g., third positional information) at ACT 525. The alignment device 165 can obtain positional information associated with the second electrode layer 155 with the second electrode layer 155 supported on the surface 160. The positional information associated with the second electrode layer 155 can be information regarding the a position of an edge, center point, a dimension, or other feature of the second electrode layer 155 relative to some reference (e.g., an edge of the surface 115, global positioning coordinates, or some other reference). The positional information associated with the second electrode layer 155 can be an angular orientation of the second electrode layer 155, such as an angular orientation relative to the surface 160 or some line.

The method 500 can include lifting the second electrode layer 155 at ACT 530. For example, the method 500 can include lifting the second electrode layer 155 from the surface 160 (or from a stack of second electrode layers 155 on the surface 160) with the second placing device 150. The second placing device 150 can be or include an actuator 152 to grasp (e.g., lift, pick up, grip, suction) the second electrode layer 155 to lift the second electrode layer 155 from the surface 160. The second placing device 150 can move the second electrode layer 155 from a first position (e.g., the surface 160) to some other position (e.g., a carrier 120 on the conveyor device 130). The second placing device 150 can lift the second electrode layer 155 based on the positional information associated with the second electrode layer 155 obtained by the alignment device 165 at ACT 525 (e.g., the third positional information). For example, the actuator 152 of the second placing device 150 can lift the second electrode layer 155 with the actuator 152 in a particular orientation (e.g., lift the second electrode layer 155 with the second electrode layer 155 square with or otherwise aligned with the actuator 152).

The method 500 can include placing the second electrode layer 155 at ACT 535. For example, the method 500 can include placing, via the second placing device 150, the second electrode layer 155 on the first electrode layer 110 with the first electrode layer 110 supported by the carrier 120. The second placing device 150 can move the second electrode layer 155 from the surface 160 to the first electrode layer 110 supported by the carrier 120 positioned in the third position 170 on the conveyor device 130. The second placing device 150 can move the second electrode layer 155 to a position on or above the first electrode layer 110 and can release the second electrode layer 155. The second electrode layer 155 can be supported by the carrier 120 on the conveyor substrate 134 of the conveyor device 130 with the first electrode layer 110 positioned between the first portion 415 of the carrier 120 and the second electrode layer 155. The method 500 can include placing the second electrode layer 155 based on the first positional information, the second positional information, or the third positional information at ACT 535. For example, the second placing device 150 can include or be coupled with a control device (e.g., the computing system 199). The second placing device 150 can receive a signal or command from the computing system 199 to control or modify an operation of the second placing device 150 to place the second electrode layer 155 in a particular manner. The first positional information and the second positional information can provide information regarding a position or other feature of the first electrode layer 110, while the third positional information can provide information regarding a position or other feature of the second electrode layer 155. The method 500 can include using the first positional information, the second positional information, or the third positional information to cause the second placing device 150 place the second electrode layer 155 on the first electrode layer 110 with the second electrode layer 155 aligned or substantially aligned (e.g., ±15% alignment) with the first electrode layer 110. The second placing device 150 can place the second electrode layer 155 on the first electrode layer 110 such that an edge of the first electrode layer 110 is aligned with an edge of the second electrode layer 155. The second placing device 150 can place the second electrode layer 155 on the first electrode layer 110 such that a center point of the first electrode layer 110 is aligned with a center point of the second electrode layer 155. The second placing device 150 can place the second electrode layer 155 on the first electrode layer 110 such that tab of the first electrode layer 110 is aligned with a tab of the second electrode layer 155. The second placing device 150 can place the second electrode layer 155 on the first electrode layer 110 such that some other feature (e.g., a corner) of the first electrode layer 110 is aligned with some other feature (e.g., a corner) of the second electrode layer 155.

Figure 6:
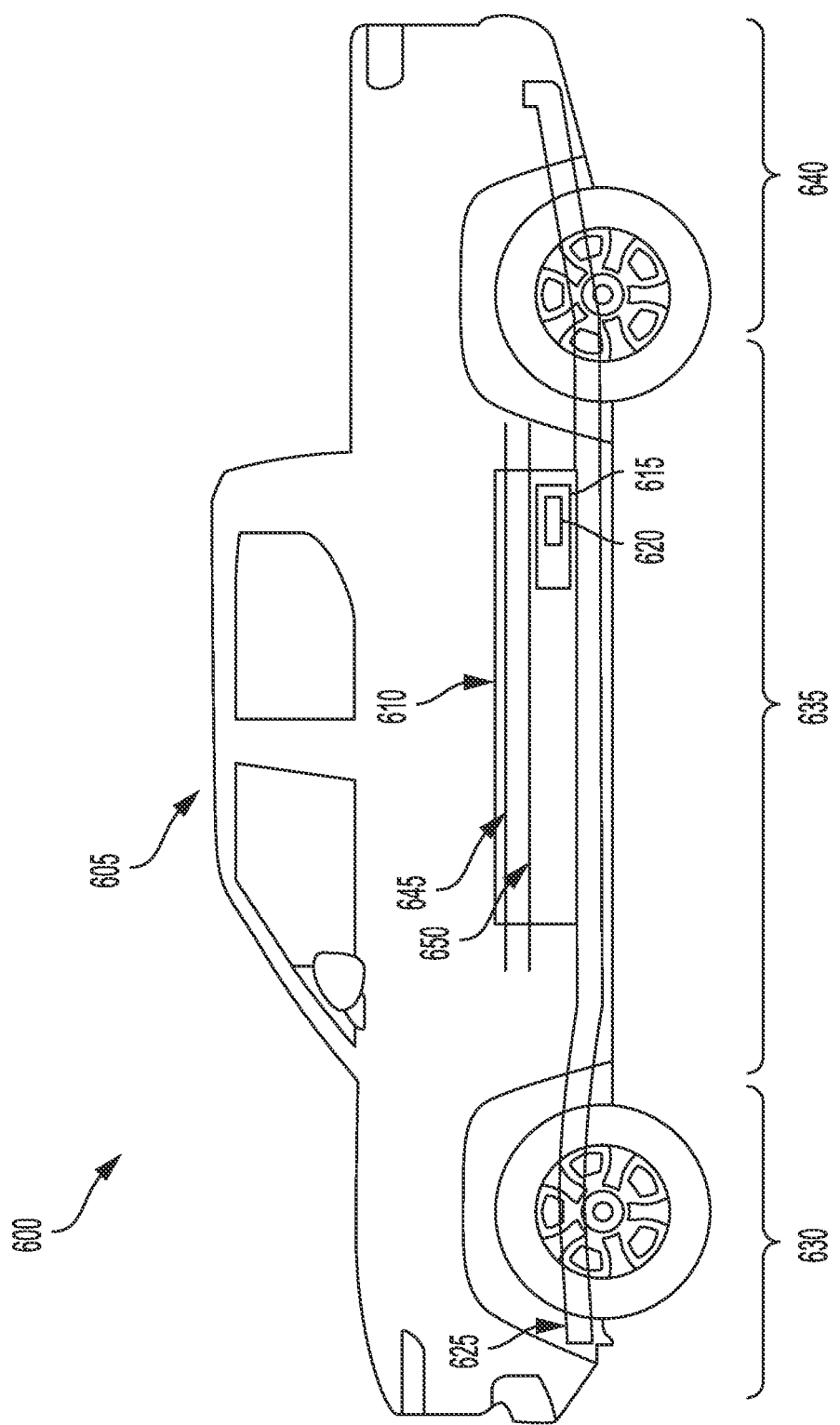
FIG. 6 depicts an example electric vehicle, in accordance with some aspects.

FIG. 6 depicts an example cross-sectional view 600 of an electric vehicle 605 installed with at least one battery pack 610. Electric vehicles 605 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 610 can also be used as an energy storage system to power a building, such as a residential home or commercial building. Electric vehicles 605 can be fully electric or partially electric (e.g., plug-in hybrid) and further, electric vehicles 605 can be fully autonomous, partially autonomous, or unmanned. Electric vehicles 605 can also be human operated or non-autonomous. Electric vehicles 605 such as electric trucks or automobiles can include on-board battery packs 610, batteries 615 or battery modules 615, or battery cells 620 to power the electric vehicles. The electric vehicle 605 can include a chassis 625 (e.g., a frame, internal frame, or support structure). The chassis 625 can support various components of the electric vehicle 605. The chassis 625 can span a front portion 630 (e.g., a hood or bonnet portion), a body portion 635, and a rear portion 640 (e.g., a trunk, payload, or boot portion) of the electric vehicle 605. The battery pack 610 can be installed or placed within the electric vehicle 605. For example, the battery pack 610 can be installed on the chassis 625 of the electric vehicle 605 within one or more of the front portion 630, the body portion 635, or the rear portion 640. The battery pack 610 can include or connect with at least one busbar, e.g., a current collector element. For example, the first busbar 645 and the second busbar 650 can include electrically conductive material to connect or otherwise electrically couple the battery 615, the battery modules 615, or the battery cells 620 with other electrical components of the electric vehicle 605 to provide electrical power to various systems or components of the electric vehicle 605.

Figure 7:
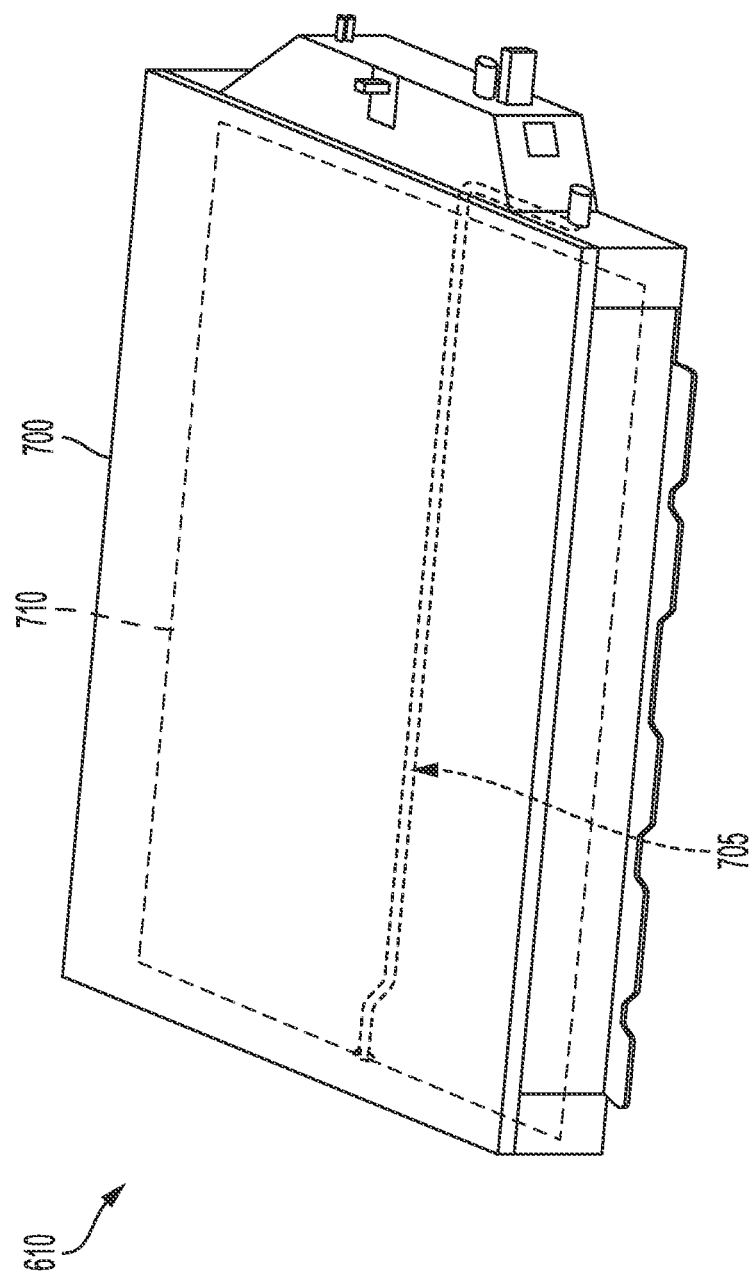
FIG. 7 depicts an example battery pack, in accordance with some aspects.
Figure 8:
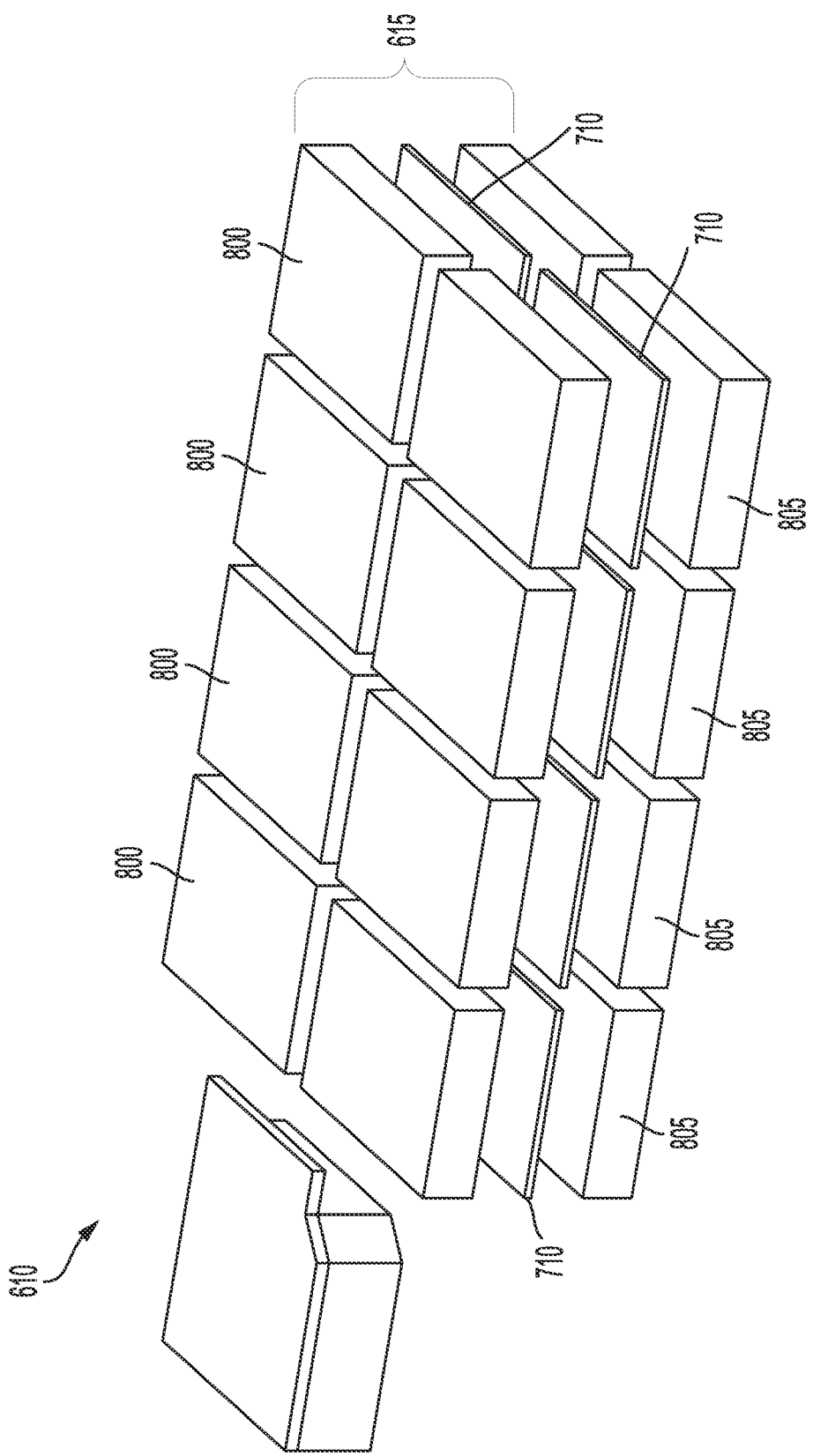
FIG. 8 depicts an example battery module, in accordance with some aspects.

FIG. 7 depicts an example battery pack 610. Referring to FIG. 7, among others, the battery pack 610 can provide power to electric vehicle 605. Battery packs 610 can include any arrangement or network of electrical, electronic, mechanical or electromechanical devices to power a vehicle of any type, such as the electric vehicle 605. The battery pack 610 can include at least one housing 700. The housing 700 can include at least one battery module 615 or at least one battery cell 620, as well as other battery pack components. The battery module 615 can be or can include one or more groups of prismatic cells, cylindrical cells, pouch cells, or other form factors of battery cells 620. The housing 700 can include a shield on the bottom or underneath the battery module 615 to protect the battery module 615 and/or cells 620 from external conditions, for example if the electric vehicle 605 is driven over rough terrains (e.g., off-road, trenches, rocks, etc.) The battery pack 610 can include at least one cooling line 705 that can distribute fluid through the battery pack 610 as part of a thermal/temperature control or heat exchange system that can also include at least one thermal component (e.g., cold plate) 710. The thermal component 710 can be positioned in relation to a top submodule and a bottom submodule, such as in between the top and bottom submodules, among other possibilities. The battery pack 610 can include any number of thermal components 710. For example, there can be one or more thermal components 710 per battery pack 610, or per battery module 615. At least one cooling line 705 can be coupled with, part of, or independent from the thermal component 710.

FIG. 7 depicts example battery modules 615, and FIGS. 9, 10 and 11 depict an example cross sectional view of a battery cell 620. The battery modules 615 can include at least one submodule. For example, the battery modules 615 can include at least one first (e.g., top) submodule 800 or at least one second (e.g., bottom) submodule 805. At least one thermal component 710 can be disposed between the top submodule 800 and the bottom submodule 805. For example, one thermal component 710 can be configured for heat exchange with one battery module 615. The thermal component 710 can be disposed or thermally coupled between the top submodule 800 and the bottom submodule 805. One thermal component 710 can also be thermally coupled with more than one battery module 615 (or more than two submodules 800, 805). The thermal components 710 shown adjacent to each other can be combined into a single thermal component 710 that spans the size of one or more submodules 800 or 805. The thermal component 710 can be positioned underneath submodule 800 and over submodule 805, in between submodules 800 and 805, on one or more sides of submodules 800, 805, among other possibilities. The thermal component 710 can be disposed in sidewalls, cross members, structural beams, among various other components of the battery pack, such as battery pack 610 described above. The battery submodules 800, 805 can collectively form one battery module 615. In some examples each submodule 800, 805 can be considered as a complete battery module 615, rather than a submodule.

The battery modules 615 can each include a plurality of battery cells 620. The battery modules 615 can be disposed within the housing 700 of the battery pack 610. The battery modules 615 can include battery cells 620 that are cylindrical cells or prismatic cells, for example. The battery module 615 can operate as a modular unit of battery cells 620. For example, a battery module 615 can collect current or electrical power from the battery cells 620 that are included in the battery module 615 and can provide the current or electrical power as output from the battery pack 610. The battery pack 610 can include any number of battery modules 615. For example, the battery pack can have one, two, three, four, five, six, seven, eight, nine, ten, eleven, twelve or other number of battery modules 615 disposed in the housing 700. It should also be noted that each battery module 615 may include a top submodule 800 and a bottom submodule 805, possibly with a thermal component 710 in between the top submodule 800 and the bottom submodule 805. The battery pack 610 can include or define a plurality of areas for positioning of the battery module 615 and/or cells 620. The battery modules 615 can be square, rectangular, circular, triangular, symmetrical, or asymmetrical. In some examples, battery modules 615 may be different shapes, such that some battery modules 615 are rectangular but other battery modules 615 are square shaped, among other possibilities. The battery module 615 can include or define a plurality of slots, holders, or containers for a plurality of battery cells 620. It should be noted the illustrations and descriptions herein are provided for example purposes and should not be interpreted as limiting. For example, the battery cells 620 can be inserted in the battery pack 610 without battery modules 800 and 805. The battery cells 620 can be disposed in the battery pack 610 in a cell-to-pack configuration without modules 800 and 805, among other possibilities.

Battery cells 620 have a variety of form factors, shapes, or sizes. For example, battery cells 620 can have a cylindrical, rectangular, square, cubic, flat, pouch, elongated or prismatic form factor. As depicted in FIG. 9, for example, the battery cell 620 can be cylindrical. As depicted in FIG. 10, for example, the battery cell 620 can be prismatic. As depicted in FIG. 11, for example, the battery cell 620 can include a pouch form factor. Battery cells 620 can be assembled, for example, by inserting the electrode layer stack 250 (e.g., a jelly roll, a jelly stack, or some other group or assembly of electrode layers) including electrolyte material into at least one battery cell housing 900. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 620 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 620. The housing 900 can be of various shapes, including cylindrical or rectangular, for example. Electrical connections can be made between the electrolyte material and components of the battery cell 620. For example, electrical connections to the electrodes with at least some of the electrolyte material can be formed at two points or areas of the battery cell 620, for example to form a first polarity terminal 905 (e.g., a positive or anode terminal) and a second polarity terminal 910 (e.g., a negative or cathode terminal). The polarity terminals can be made from electrically conductive materials to carry electrical current from the battery cell 620 to an electrical load, such as a component or system of the electric vehicle 605.

For example, the battery cell 620 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 620 to separate the anode and cathode from each other and to facilitate transfer of lithium ions between the anode and cathode. It should be noted that battery cell 620 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 620 can be included in battery modules 615 or battery packs 610 to power components of the electric vehicle 605. The battery cell housing 900 can be disposed in the battery module 615, the battery pack 610, or a battery array installed in the electric vehicle 605. The housing 900 can be of any shape, such as cylindrical with a circular (e.g., as depicted in FIG. 9, among others), elliptical, or ovular base, among others. The shape of the housing 900 can also be prismatic with a polygonal base, as shown in FIG. 10, among others. As shown in FIG. 11, among others, the housing 900 can include a pouch form factor. The housing 900 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 900 of the battery cell 620 can include one or more materials with various electrical conductivity or thermal conductivity, or a combination thereof. The electrically conductive and thermally conductive material for the housing 900 of the battery cell 620 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 900 of the battery cell 620 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 900 of the battery cell 620 is prismatic (e.g., as depicted in FIG. 10, among others) or cylindrical (e.g., as depicted in FIG. 9, among others), the housing 900 can include a rigid or semi-rigid material such that the housing 900 is rigid or semi-rigid (e.g., not easily deformed or manipulated into another shape or form factor). In examples where the housing 900 includes a pouch form factor (e.g., as depicted in FIG. 11, among others), the housing 900 can include a flexible, malleable, or non-rigid material such that the housing 900 can be bent, deformed, manipulated into another form factor or shape.

The battery cell 620 can include at least one anode layer 915, which can be disposed within the cavity 920 defined by the housing 900. The anode layer 915 can be one or more of the first electrode layer 110, the second electrode layer 155, the third electrode layer 184, the fourth electrode layer 230, the fifth electrode layer 235, or some other electrode layer. The anode layer 915 can include a first redox potential. The anode layer 915 can receive electrical current into the battery cell 620 and output electrons during the operation of the battery cell 620 (e.g., charging or discharging of the battery cell 620). The anode layer 915 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 620 can include at least one cathode layer 925 (e.g., a composite cathode layer compound cathode layer, a compound cathode, a composite cathode, or a cathode). The cathode layer 925 can be one or more of the first electrode layer 110, the second electrode layer 155, the third electrode layer 184, the fourth electrode layer 230, the fifth electrode layer 235, or some other electrode layer. The cathode layer 925 can include a second redox potential that can be different than the first redox potential of the anode layer 915. The cathode layer 925 can be disposed within the cavity 920. The cathode layer 925 can output electrical current out from the battery cell 620 and can receive electrons during the discharging of the battery cell 620. The cathode layer 925 can also receive lithium ions during the discharging of the battery cell 620. Conversely, the cathode layer 925 can receive electrical current into the battery cell 620 and can output electrons during the charging of the battery cell 620. The cathode layer 925 can release lithium ions during the charging of the battery cell 620.

The battery cell 620 can include an electrolyte layer, such as the separator layer 310 or a bisected (e.g., cut, singulated, or otherwise separated) portion of the separator layer 310 disposed within the cavity 920. The separator layer 310 can be arranged between the anode layer 915 and the cathode layer 925 to separate the anode layer 915 and the cathode layer 925. A separator can be wetted with a liquid electrolyte. The liquid electrolyte can be diffused into the anode layer 915. The liquid electrolyte can be diffused into the cathode layer 925. The separator layer 310 can help transfer ions between the anode layer 915 and the cathode layer 925. The separator layer 310 can transfer $Li^+$ cations from the anode layer 915 to the cathode layer 925 during the discharge operation of the battery cell 620. The separator layer 310 can transfer lithium ions from the cathode layer 925 to the anode layer 915 during the charge operation of the battery cell 620.

The redox potential of layers (e.g., the first redox potential of the anode layer 915 or the second redox potential of the cathode layer 925) can vary based on a chemistry of the respective layer or a chemistry of the battery cell 620. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 925). Lithium-ion batteries can include a graphite chemistry, a silicon-graphite chemistry, or a lithium metal chemistry for the anode layer (e.g., the anode layer 915).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example Lithium iron phosphate (LFP), Lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 925). Lithium-ion batteries can include a graphite chemistry, a silicon-graphite chemistry, or a lithium metal chemistry for the anode layer (e.g., the anode layer 915). For example, a cathode layer having an LFP chemistry can have a redox potential of 3.4

V vs. Li/Li$^+$, while an anode layer having a graphite chemistry can have a 0.2 V vs. Li/Li$^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 925) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 915) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The separator layer 310 can include or be made of a liquid electrolyte material. For example, the separator layer 310 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the separator layer 310 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others.

The separator layer 310 can include or be made of a solid electrolyte material, such as a ceramic electrolyte material, polymer electrolyte material, or a glassy electrolyte material, or among others, or any combination thereof.

The solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO$_3$ (A=Li, Ca, Sr, La, and B=Al, Ti), garnet-type with formula A$_3$B$_2$(XO$_4$)$_3$ (A=Ca, Sr, Ba and X=Nb, Ta), lithium phosphorous oxy-nitride (Li$_x$PO$_y$N$_z$). In some embodiments, the solid electrolyte layer can include a glassy, ceramic and/or crystalline sulfide-based electrolyte (e.g., Li$_3$PS$_4$, Li$_7$P$_3$S$_{11}$, Li$_2$S—P$_2$S$_5$, Li$_2$S—B$_2$S$_3$, SnS—P$_2$S$_5$, Li$_2$S—SiS$_2$, Li$_2$S—P$_2$S$_5$, Li$_2$S—GeS$_2$, Li$_{10}$GeP$_2$S$_{12}$) and/or sulfide-based lithium argyrodites with formula Li$_6$PS$_5$X (X=Cl, Br) like Li$_6$PS$_5$Cl). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the separator layer 310 includes a liquid electrolyte material, the separator layer 310 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The separator layer 310 can include at least one additive. The additives can be or include vinylidene carbonate, fluoroethylene carbonate, ethyl propionate, methyl propionate, methyl acetate, ethyl acetate, or a mixture of any two or more thereof. The separator layer 310 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the separator layer 310 from greater than 0 M to about 1.5 M.

FIG. 12 depicts an example block diagram of an example computer system 199. The computer system or computing device 199 can include or be used to implement a data processing system or its components. The computing system 199 includes at least one bus 1200 or other communication component for communicating information and at least one processor 1210 or processing circuit coupled to the bus 1200 for processing information. The computing system 199 can also include one or more processors 1205 or processing circuits coupled to the bus for processing information. The computing system 199 also includes at least one main memory 1210, such as a random access memory (RAM) or other dynamic storage device, coupled to the bus 1200 for storing information, and instructions to be executed by the processor 1205. The main memory 1210 can be used for storing information during execution of instructions by the processor 1205. The computing system 199 may further include at least one read only memory (ROM) 1215 or other static storage device coupled to the bus 1200 for storing static information and instructions for the processor 1205. A storage device 1220, such as a solid state device, magnetic disk or optical disk, can be coupled to the bus 1200 to persistently store information and instructions.

The computing system 199 may be coupled via the bus 1200 to a display 1230, such as a liquid crystal display, or active matrix display, for displaying information to a user such as a driver of the electric vehicle 605 or other end user. An input device 1225, such as a keyboard or voice interface may be coupled to the bus 1200 for communicating information and commands to the processor 1205. The input device 1225 can include a touch screen display 1230. The input device 1225 can also include a cursor control, such as a mouse, a trackball, or cursor direction keys, for communicating direction information and command selections to the processor 1205 and for controlling cursor movement on the display 1230.

The processes, systems and methods described herein can be implemented by the computing system 199 in response to the processor 1205 executing an arrangement of instructions contained in main memory 1210. Such instructions can be read into main memory 1210 from another computer-readable medium, such as the storage device 1220. Execution of the arrangement of instructions contained in main memory 1210 causes the computing system 199 to perform the illustrative processes described herein. One or more processors in a multi-processing arrangement may also be employed to execute the instructions contained in main memory 1210. Hard-wired circuitry can be used in place of or in combination with software instructions together with the systems and methods described herein. Systems and methods described herein are not limited to any specific combination of hardware circuitry and software.

Although an example computing system has been described in FIG. 12, the subject matter including the operations described in this specification can be implemented in other types of digital electronic circuitry, or in computer software, firmware, or hardware, including the structures disclosed in this specification and their structural equivalents, or in combinations of one or more of them.

Figure 13:
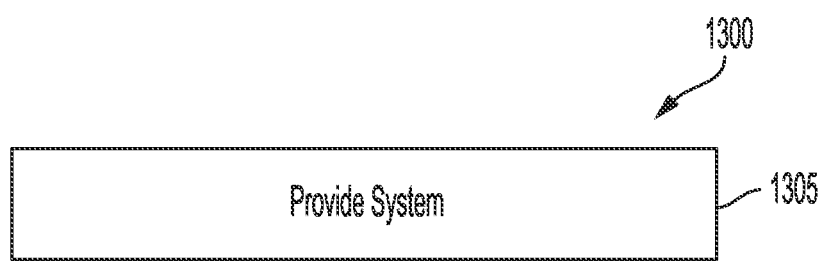
FIG. 13 is a flow diagram of an example method of providing a system, in accordance with some aspects.

FIG. 13, among others, depicts a method 1300 of providing a system. The system can be the system 100 or the system 300 as herein described. For example, the method 1300 can include providing the system 100 or the system 300 at ACT 1305. The system can include a conveyor device 130 including a conveyor substrate 134. The system can include a carrier 120 coupled with the conveyor device 130 where the conveyor device 130 can move the carrier 120. The system can include at least one first placing device 105 to place a first electrode layer 110 on the carrier 120 and a second placing device 150 to place a second electrode layer 155 on the first electrode layer 110 with the first electrode layer on the carrier 120. The system can include a first alignment device 125 to obtain first positional information regarding the first electrode layer 110 before the first electrode layer 110 is placed on the carrier 120 and a second alignment device 145 to obtain second positional information regarding the first electrode layer 110 with the first electrode layer 110 on the carrier 120. The system can include a third alignment device 165 to obtain third positional information associated with the second electrode layer 155. The second placing device 150 can place the second electrode layer 155 on the first electrode layer 110 based on the first positional information, the second positional information, or the third positional information. The system can include at least one separator layer positioned between the first electrode layer 110 and the second electrode layer 155. The separator layer can be placed over the first electrode layer 110 as a singulated sheet (e.g., by a placing device such as the first placing device 105 or the second placing device 150) or as a continuous web (e.g., by a tensioning device 315 or a holding device 320).

Figure 14:
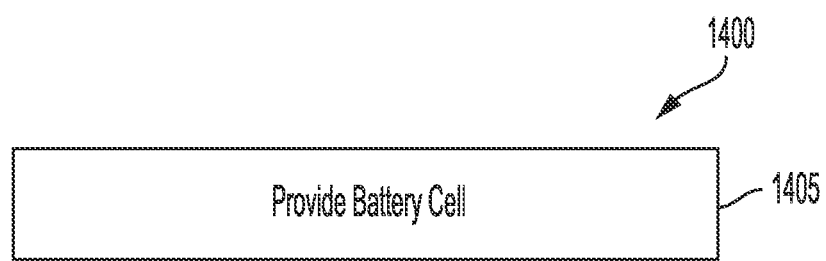
FIG. 14 is a flow diagram of an example method of providing a battery cell, in accordance with some aspects.

FIG. 14, among others, depicts a flow chart of a method 1400 of providing a battery cell at ACT 1405. The battery cell can be the battery cell 620 including the electrode layer stack 250 produced by the system 100 or the system 300. For example, the method 1400 can include providing the battery cell 620 including the electrode layer stack 250 manufactured by the system 100 or the system 300. The electrode layer stack 250 can include a first electrode layer 110 and a second electrode layer 155. The electrode layer stack 250 can include the second electrode layer 155 placed on the first electrode layer 110 by a placing device (e.g., the second placing device 150). The second electrode layer 155 can be placed on the first electrode layer 110 by the second placing device 150, where the second placing device 150 can place the second electrode layer 155 on the first electrode layer 110 based on positional information regarding the first electrode layer 110 or the second electrode layer 155. For example, the second placing device 150 can place the second electrode layer 155 based on first positional information regarding the first electrode layer 110 before the first electrode layer 110 is lifted by the first placing device 105, second positional information regarding the first electrode layer 110 after the first electrode layer 110 is placed on the carrier 120, or third positional information regarding the second electrode layer 155 before the second electrode layer is lifted by the second placing device 150. The battery cell 620 can include the electrode layer stack 250 having at least one separator layer 310 positioned between the first electrode layer 110 and the second electrode layer 155.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to manufacture an electrode layer stack, comprising:
    a conveyor device to move a carrier;
    a first placing device to place a first electrode layer on the carrier;
    a first alignment device to obtain first positional information associated with the first electrode layer; and
    a second placing device to place a second electrode layer on the first electrode layer based on the first positional information to form the electrode layer stack, the electrode layer stack including a separator layer between the first electrode layer and the second electrode layer.

2. The system of claim 1, wherein the first placing device includes a first actuator to place the first electrode layer on the carrier.

3. The system of claim 1, wherein the first placing device includes a tensioning device and a holding device, the tensioning device to apply a tension to an electrode layer web, the holding device to hold the electrode layer web, the electrode layer web including the first electrode layer.

4. The system of claim 1, comprising:
    the conveyor device to move the carrier from a first position to a second position and from the second position to a third position, the first placing device to place the first electrode layer with the carrier in the first position, the first alignment device to obtain the first positional information with the carrier in the second position, and the second placing device to place the second electrode layer with the carrier in the third position.

5. The system of claim 1, comprising:
    a second alignment device to obtain second positional information associated with the first electrode layer, the first placing device to place the first electrode layer based on the second positional information; and
    a third alignment device to obtain third positional information associated with the second electrode layer, the second placing device to place the second electrode layer based on the third positional information.

6. The system of claim 1, comprising:
    a second alignment device to obtain second positional information associated with the first electrode layer, the first placing device to place the first electrode layer based on the second positional information; and
    a third alignment device to obtain third positional information associated with the second electrode layer, the second placing device to place, based on the third positional information the second electrode layer on the first electrode layer with a center point of the first electrode layer aligned with a center point of the second electrode layer based on the first positional information or the third positional information.

7. The system of claim 1, comprising:
    a second alignment device to obtain second positional information associated with the first electrode layer, the first placing device to place the first electrode layer based on the second positional information; and
    a third alignment device to obtain third positional information associated with the second electrode layer, the second placing device to place, based on the third positional information the second electrode layer on the first electrode layer with an edge of the first electrode layer aligned with an edge of the second electrode layer based on the first positional information or the third positional information.

8. The system of claim 1, wherein the first electrode layer is a singulated mono-cell electrode layer including a battery electrode layer laminated with the separator layer.

9. The system of claim 1, comprising:
the conveyor device to move the carrier from a first position to a second position, the first placing device to place the first electrode layer with the carrier in the first position, wherein the separator layer is provided between the first electrode layer and the second electrode layer with the carrier in the second position.

10. The system of claim 1, wherein the separator layer is a first separator layer, the system comprising:
the conveyor device to move the carrier from a first position to a second position and from the second position to a third position, the first placing device to place the first electrode layer with the carrier in the first position, the second placing device to place the second electrode layer with the carrier in the third position;
a first portion of a second separator layer positioned between the first electrode layer and the carrier; and
a first portion of the first separator layer positioned between the second electrode layer and the first electrode layer.

11. The system of claim 1, wherein the carrier is a first carrier and the separator layer is a first separator layer, the system comprising:
the conveyor device to move the first carrier and a second carrier from a first position to a second position and from the second position to a third position;
the first placing device to place the first electrode layer on the first carrier with the first carrier in the first position and place a third electrode layer on the second carrier with the second carrier in the first position;
the second placing device to place the second electrode layer on the first carrier with the first carrier in the third position and place a fourth electrode layer on the second carrier with the second carrier in the third position;
a second separator layer including a first portion of the second separator layer positioned between the first electrode layer and the first carrier and a second portion of the second separator layer positioned between the third electrode layer and the second carrier, wherein the first portion of the second separator layer and the second portion of the second separator layer are continuous; and
the first separator layer including a first portion of the first separator layer positioned between the second electrode layer and the first electrode layer and a second portion of the first separator layer positioned between the fourth electrode layer and the third electrode layer, wherein the first portion of the first separator layer and the second portion of the first separator layer are continuous.

12. The system of claim 1, wherein the carrier is a first carrier and the separator layer is a first separator layer, the system comprising:
the conveyor device to move the first carrier and a second carrier from a first position to a second position and from the second position to a third position;
the first placing device to place the first electrode layer on the first carrier with the first carrier in the first position and place a third electrode layer on the second carrier with the second carrier in the first position;
the second placing device to place the second electrode layer on the first carrier with the first carrier in the third position and place a fourth electrode layer on the second carrier with the second carrier in the third position;
a second separator layer including a first portion of the second separator layer positioned between the first electrode layer and the first carrier and a second portion of the second separator layer positioned between the third electrode layer and the second carrier, wherein the first portion of the second separator layer and the second portion of the second separator layer are continuous;
the first separator layer including a first portion of the first separator layer positioned between the second electrode layer and the first electrode layer and a second portion of the first separator layer positioned between the fourth electrode layer and the third electrode layer, wherein the first portion of the first separator layer and the second portion of the first separator layer are continuous; and
a cutting device to separate the first portion of the second separator layer from the second portion of the second separator layer.

13. The system of claim 1, wherein the carrier is a first carrier, the system comprising:
the conveyor device to move the first carrier and a second carrier from a first position to a second position, from the second position to a third position, from the third position to a fourth position, and from the fourth position to a fifth position;
the first placing device to place the first electrode layer on the first carrier with the first carrier in the first position and place a third electrode layer on the second carrier with the second carrier in the first position;
the second placing device to place the second electrode layer on the first carrier with the first carrier in the third position and place a fourth electrode layer on the second carrier with the second carrier in the third position; and
a third placing device to place a fifth electrode layer on the second electrode layer with the first carrier in the fifth position and place a sixth electrode layer on the fourth electrode layer with the second carrier in the fifth position.

14. The system of claim 1, wherein the carrier is a first carrier and the separator layer is a first separator layer, the system comprising:
the conveyor device to move the first carrier and a second carrier from a first position to a second position, from the second position to a third position, from the third position to a fourth position, and from the fourth position to a fifth position;
the first placing device to place the first electrode layer on the first carrier with the first carrier in the first position and place a third electrode layer on the second carrier with the second carrier in the first position;
the second placing device to place the second electrode layer on the first carrier with the first carrier in the third position and place a fourth electrode layer on the second carrier with the second carrier in the third position;
a third placing device to place a fifth electrode layer on the second electrode layer with the first carrier in the fifth position and place a sixth electrode layer on the fourth electrode layer with the second carrier in the fifth position
a second separator layer including a first portion of the second separator layer positioned between the first electrode layer and the first carrier and a second portion of the second separator layer positioned between the third electrode layer and the second carrier, wherein the first portion of the second separator layer and the second portion of the second separator layer are continuous;
the first separator layer including a first portion of the first separator layer positioned between the second electrode layer and the first electrode layer and a second portion of the first separator layer positioned between the fourth electrode layer and the third electrode layer, wherein the first portion of the first separator layer and the second portion of the first separator layer are continuous; and
a third separator layer including a first portion of the third separator layer positioned between the fifth electrode layer and the second electrode layer and a second portion of the third separator layer positioned between the sixth electrode layer and the fourth electrode layer, wherein the first portion of the third separator layer and the second portion of the third separator layer are continuous.

15. A method, comprising:
placing, via a first placing device, a first electrode layer in a carrier with the carrier in a first position;
obtaining, via a first alignment device, positional information associated with the first electrode layer with the carrier in a second position; and
placing, via a second placing device based on the positional information, a second electrode layer on the first electrode layer with the carrier in a third position to form an electrode layer stack, the electrode layer stack including a first separator layer between the first electrode layer and the second electrode layer.

16. The method of claim 15, comprising:
obtaining, via a second alignment device, second positional data associated with the first electrode layer, wherein placing the first electrode layer in the carrier is based on the second positional data.

17. The method of claim 15, comprising:
providing a first portion of a second separator layer between the first electrode layer and the carrier with the carrier in the first position; and
providing a first portion of the first separator layer between the second electrode layer and the first electrode layer with the carrier in the third position.

18. The method of claim 15, wherein the first electrode layer is a singulated mono-cell electrode including a battery electrode layer laminated with the first separator layer.

19. An electric vehicle, comprising:
a battery cell comprising a plurality of electrode layers stacked to form an electrode layer stack, the electrode layer stack produced by:
placing, via a first placing device, a first electrode layer in a carrier with the carrier in a first position;
obtaining, via a first alignment device, positional information associated with the first electrode layer with the carrier in a second position; and
placing, via a second placing device based on the positional information, a second electrode layer on the first electrode layer with the carrier in a third position to form the electrode layer stack, the electrode layer stack including a first separator layer between the first electrode layer and the second electrode layer.

20. The electric vehicle of claim 19, the electrode layer stack produced by:
providing a first portion of a second separator layer between the first electrode layer and the carrier with the carrier in the first position; and
providing a first portion of the first separator layer between the second electrode layer and the first electrode layer with the carrier in the third position.

* * * * *